US007761541B1

(12) United States Patent
Morley et al.

(10) Patent No.: US 7,761,541 B1
(45) Date of Patent: Jul. 20, 2010

(54) SERVICE ENABLING TECHNOLOGY

(75) Inventors: Robert S. Morley, Ottawa (CA); Kris W. Kramer, Kanata (CA); Peter Blatherwick, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1619 days.

(21) Appl. No.: 09/695,108

(22) Filed: Oct. 25, 2000

(51) Int. Cl.
G06F 15/173 (2006.01)
(52) U.S. Cl. .................... 709/223; 709/215; 714/4; 370/271; 370/475; 370/260; 370/352
(58) Field of Classification Search .................. 709/223, 709/204, 208, 224, 215; 358/1.115; 714/4; 370/271, 475, 260, 352
See application file for complete search history.

(56) References Cited

U.S. PATENT DOCUMENTS 5,136,585 A * 8/1992 Nizamuddin et al. ........ 370/271
6,266,782 B1 * 7/2001 Carter et al. ................... 714/4
6,505,245 B1 * 1/2003 North et al. ................ 709/223
6,560,620 B1 * 5/2003 Ching ........................ 715/511
6,618,398 B1 * 9/2003 Marchetti et al. ........... 370/475
6,618,756 B1 * 9/2003 Katsurabayashi ........... 709/224
6,717,689 B1 * 4/2004 Endo et al. ................. 358/1.15
7,110,391 B1 * 9/2006 Rogers et al. ............... 370/352

FOREIGN PATENT DOCUMENTS

| EP | 0 817 461 A2 | 1/1998 |
| WO | WO 98/09213 | 3/1998 |
| WO | WO 99/26153 | 5/1999 |
| WO | WO 00/28696 | 5/2000 |

* cited by examiner

*Primary Examiner*—Tammy T Nguyen

(57) ABSTRACT

A network intelligence provides stateless elemental device control to a plurality of network connected components. Selected ones of the network connected components may be associated with one another as an aggregate device and the state of each associated component may be maintained at the network intelligence in a logical model of the aggregate device. Service adapters in the network intelligence may represent this association of components to data network services as a single, multi-function device.

37 Claims, 20 Drawing Sheets

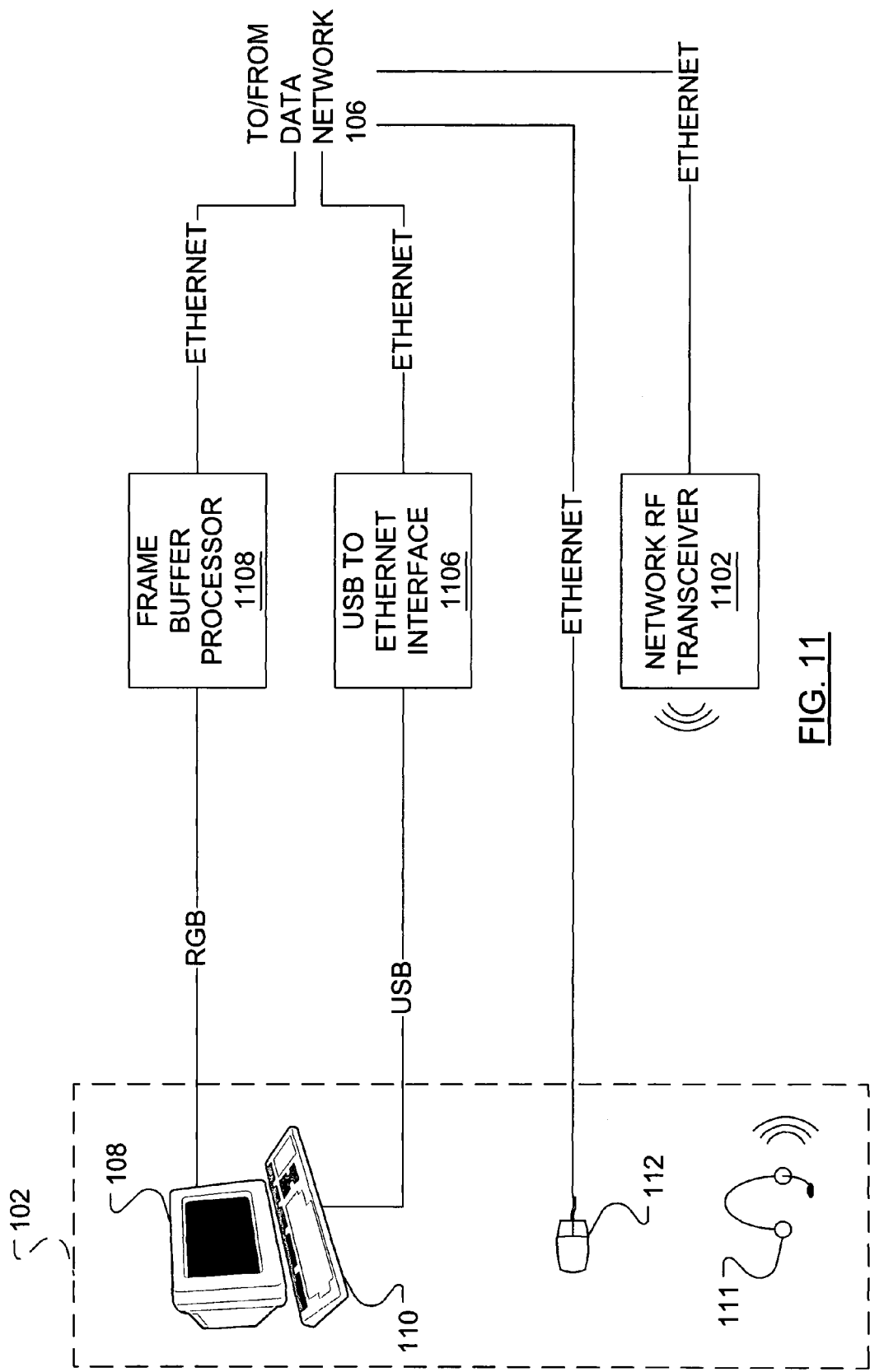

SERVICE ENABLING TECHNOLOGY

FIELD OF THE INVENTION

The present invention relates to control of components of devices and, more particularly, the present invention enables interaction of data network services with the components.

BACKGROUND OF THE INVENTION

In a network of computing devices, many schemes of presenting applications to users of network connected devices may exist. Two common schemes are called "hosted" and "distributed". In a hosted computing scheme, a user at a "terminal" computer may run applications and store data on a "mainframe" computer, processor, or processor array, whereas, in distributed computing, the running of various applications and storing of data is spread out among many personal workstations or office computers. In a popular version of distributed computing, the workstation computer provides some processing and storage capabilities while requesting further processing and storage capabilities from other "server" computers, as required.

The economics of simple database access (e.g. for car parts, airline tickets, hotel bookings, car rentals) have resulted in a continued and substantial presence of mainframe computer infrastructure (hosted computing) in commercial applications.

Distributed computing gained popularity in the 1980's as networking costs associated with hosted computing, in the form of high-density and high-demand Virtual Machine deployments, grew and powerful, low cost, stand-alone computers became available that outpaced mainframe processing capability. Commercial applications, where bandwidth and processor demand at the end user device remained low, retained their mainframe architectures and commensurate lower maintenance complexity. With the advent of the World Wide Web, and ever decreasing costs of networking, many operators have started to question the efficacy of the distributed model of provisioning powerful, but maintenance intensive equipment at the personal workstation.

As existing distributed computing schemes, relating to user applications and commensurate maintenance applications (security, backup, upgrade), become less competitive with hosted computing schemes due to the falling costs of bandwidth and connectivity, a solution resembling the hosted computing scheme may return to prominence. As the hosted computing scheme returns to prominence, a need will exist for the provision of data network services to network connected device components under control of a host computing device.

SUMMARY OF THE INVENTION

A network intelligence, executing on one or more host computing devices, provides stateless elemental device control to a plurality of device components, some of which may be network-connected. Selected ones of the device components may be logically associated with one another as an aggregate logical device and the state of each associated component may be maintained at the network intelligence in a logical model of the aggregate logical device. Service adapters in the network intelligence may provide access to network-based services or provide stand-alone services through these logically associated device components by representing the components to the services as a single, aggregated whole. Service adaptation logic is contained in the service adapters and makes use of the unified logical model of the aggregate logical device presented by lower software layers.

Advantageously, a packet network between the components and the network intelligence can allow a flexible logical association of the components to each other wherever the components may be on the network. Thus, the present invention allows physically or functionally unconnected components to be aggregated in the network intelligence into a logical whole. As well, one or more data network service adapters may be executed by the network intelligence to provide access to network-based services, or provide stand-alone services, to the logically associated, network-connected components. Due to the use, by these data network service adapters, of a logical device model maintained in the network intelligence, the service adaptation logic need not be aware of the specific physical components involved. The state of this device model may be projected to components of one or more physical devices. Although different device components may be physically integrated, the components may not necessarily be logically associated except at the network intelligence, or different components of the same physical device my be logically associated with different logical device models at the network intelligence.

In accordance with an aspect of the present invention there is provided a method of providing device control to at least one device component, the device control enabling interaction of a data network service with the at least one device component. The method includes communicating with the at least one device component, logically associating a selection of the at least one device component in an aggregate logical device, maintaining a logical model of the aggregate logical device and providing access to the data network service by representing the selection of the at least one device component to the data network service as the aggregate logical device. In another aspect of the present invention, a network intelligence is provided for carrying out this method. In a further aspect of the present invention, there is provided a software medium that permits a general purpose computer to carry out this method.

In accordance with a further aspect of the present invention there is provided a method of sending a message from a device component to a server of data network services including receiving an encapsulated message at the device component, de-encapsulating the encapsulated message to result in a message destined for the server and sending the message to the server. Advantageously, a device component that performs this method is not required to be aware of the meaning of the message.

In accordance with a further aspect of the present invention there is provided, at a device component, a method of receiving a message from a server of data network services including receiving the message, encapsulating the message to result in an encapsulated message and sending the encapsulated message to an interpreter of the message. Advantageously, a device component that performs this method is not required to be aware of the meaning of the message.

In accordance with still another aspect of the present invention there is provided a communication system including a plurality of devices connected to a data network and a network intelligence connected to the data network for providing device control to the plurality of devices and, where the data network is also connected to a data network service, for providing access to the data network service by representing selected ones of the plurality of devices to the data network service as an aggregate logical device.

In accordance with yet another aspect of the present invention there is provided a method of providing device control to at least one device component, the device control enabling interaction of a stand-alone service with the at least one device component. The method includes communicating with the at least one device component, logically associating a selection of the at least one device component in an aggregate logical device, maintaining a logical model of the aggregate logical device and providing access to the stand-alone service by representing the selection of the at least one device component to the stand-alone service as the aggregate logical device.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 11 illustrates connections between components of the first aggregate device and the network of FIG. 1;

DETAILED DESCRIPTION

Figure 1:
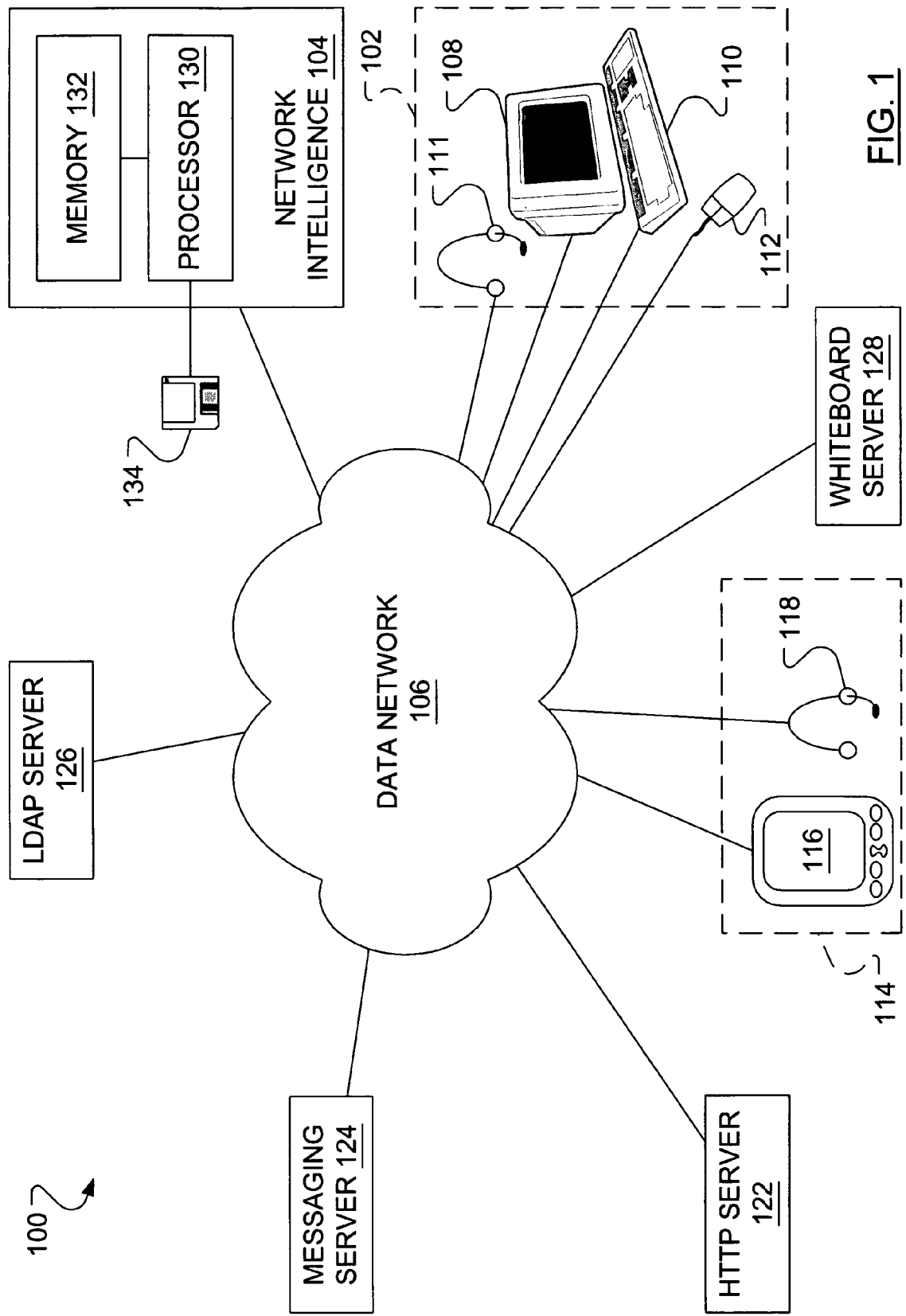
FIG. 1 schematically illustrates a data network system including servers and aggregate devices.

Illustrated in FIG. 1 is a network system 100 that may be employed by a user at a stationary workstation 102 or a mobile workstation 114 to access various data network services provided over a data network 106. Such services may include, for example, information from the World Wide Web provided by a Hyper-Text Transfer Protocol (HTTP) server 122, electronic messages (voice, fax, e-mail, video, etc.) from a messaging server 124, directory information (telephone directory numbers, e-mail addresses, etc.) from a directory server 126 and collaborative conferencing from a whiteboard server 128. A network intelligence 104, including a processor 130 and a memory 132, may control the presentation of these data network services to the stationary workstation 102 or the mobile workstation 114. Although the network intelligence 104 is shown in a centralized form, a distributed form wherein the processor 130 is, in fact, a plurality of processors is also contemplated. The processor 130 may be loaded with service enabling software for executing a method exemplary of this invention from a software medium 134. Software medium 134 may be a disk, a tape, a chip or a random access memory containing a file downloaded from a remote source. The stationary workstation 102 includes a range of input and output devices including, for example, a display element 108, a keyboard 110, a "stationary" headset 111 and a mouse 112. The mobile workstation 114 also includes a range of input and output devices, in particular, a handheld computing device 116 and a "mobile" headset 118. The mobile headset 118 may include both a microphone and at least one speaker or earphone. Both the stationary workstation 102 and the mobile workstation 114 may include functional devices that allocate a subset of their resources to execute simple behavior such that a given functional device appears, to the network intelligence 104, as a component of an aggregate device. The data network 106 may include both a private data network and a public data network. The private data network may be in the nature of a local area network (LAN), such as one employing the Ethernet protocol, while the public data network may be a wide area network (WAN) such as the Internet.

In overview, through interaction with components of an "aggregate device" (e.g., the stationary workstation 102, the mobile workstation 114), a user causes messages to be sent from the components of the device to the network intelligence 104. The network intelligence maintains a logical model of the workstation wherein the state of each component of the workstation is maintained. It may be that components that are not associated with each other physically are associated with each other logically in the network intelligence 104, or it may also be that components that are associated with each other physically are logically associated with different logical models maintained by the network intelligence 104. Due to this logical aggregation of components at network intelligence 104, the workstation may generically be referred to as an aggregate device. As well as associating components in a logical model of an aggregate device, the network intelligence 104 may also associate one or more service adapters with particular data network services that may be presented to the user of the workstation to which a particular logical model corresponds. The messages received by the network intelligence 104 from the workstation components represent changes in state of one or more of the workstation components and may result in generation of a request to be sent to a server. This request originates at the service adapter associated with the server to which the request is to be sent.

The network intelligence 104 may represent the aggregate device to a server, that is, a request may be sent to the server from the network intelligence 104 on behalf of the aggregate device. A response to the request is then sent from the server to the network intelligence 104 where the response is interpreted by the service adapter associated with that service. Based on this interpretation, the states of the components in the logical model of the workstation may be changed and messages may be forwarded to the aggregate device to correspondingly alter the state of the actual components. In some instances, like real-time communication, the network intelligence 104 may encapsulate server requests and send the encapsulated request to a component of the workstation for forwarding to the server. In this latter method, the server request appears, to the server, to have originated at the component of the workstation. Yet, the component is not required to have any knowledge of the purpose or the meaning of the server request.

Figure 2:
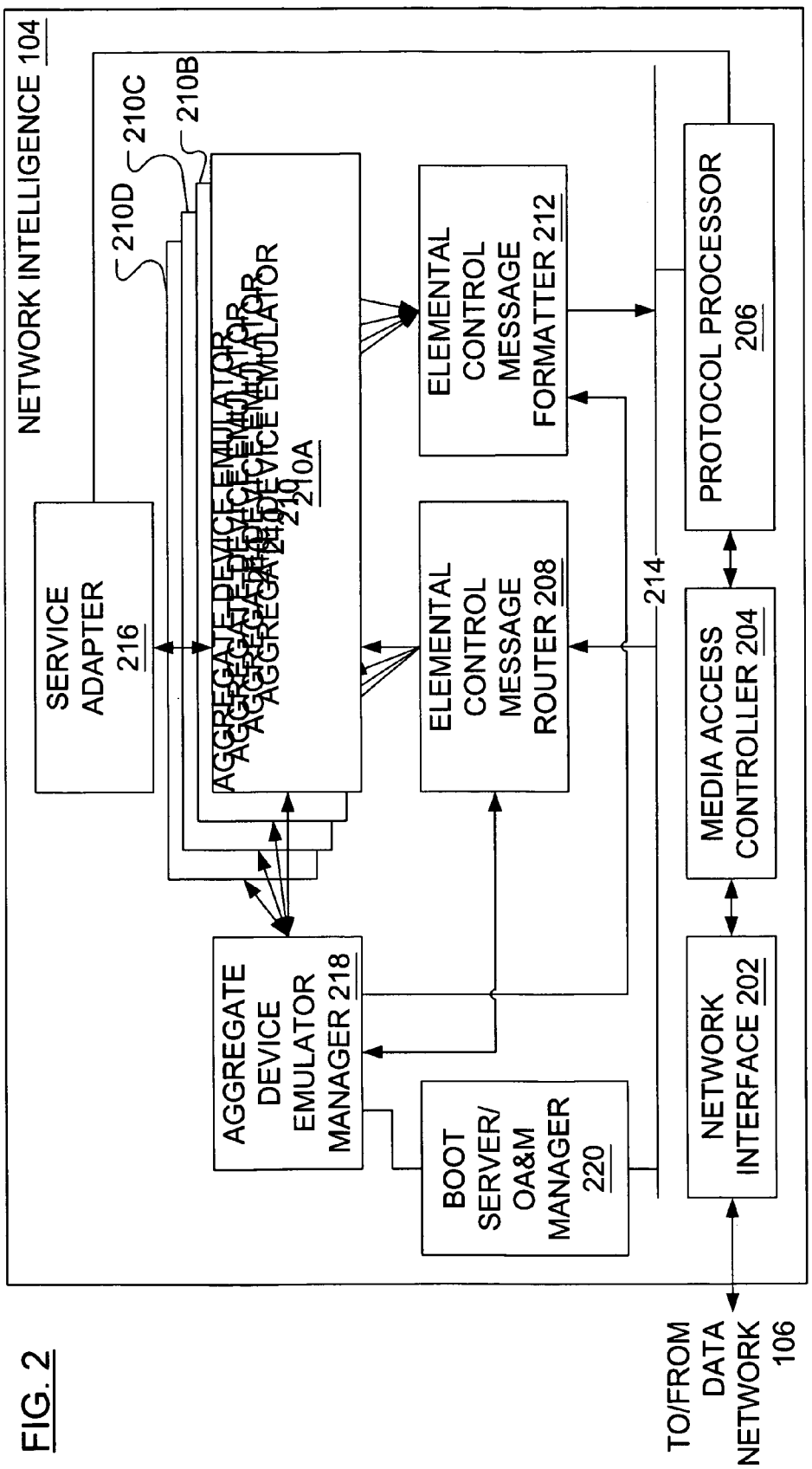
FIG. 2 schematically illustrates elements of a network intelligence for use in the system of FIG. 1 in an embodiment of the present invention.

Turning to FIG. 2, elements of the network intelligence 104 are in evidence. A network interface 202 allows connection of the network intelligence 104 to the data network 106 (FIG. 1) and communicates with a medium access controller (MAC) 204. A protocol processor 206 may receive packets from the MAC 204 and pass messages, extracted from the packets, to a message bus 214. An elemental control message router 208 may communicate with aggregate device emulators 210A, 210B, 210C, 210D and an aggregate device emulator manager 218. The aggregate device emulator manager 218 also communicates with the aggregate device emulators 210A, 210B, 210C, 210D. Messages may be passed by any one of the aggregate device emulators 210A, 210B, 210C, 210D to the message bus 214 via an elemental control message formatter 212. A terminal boot server and an associated operations, administration and maintenance (OA&M) manager 220 may be also included in the network intelligence 104 and connected for communication with both the aggregate device emulator manager 218 and, via the message bus 214, etc., the data network 106 (FIG. 1).

Figure 3:
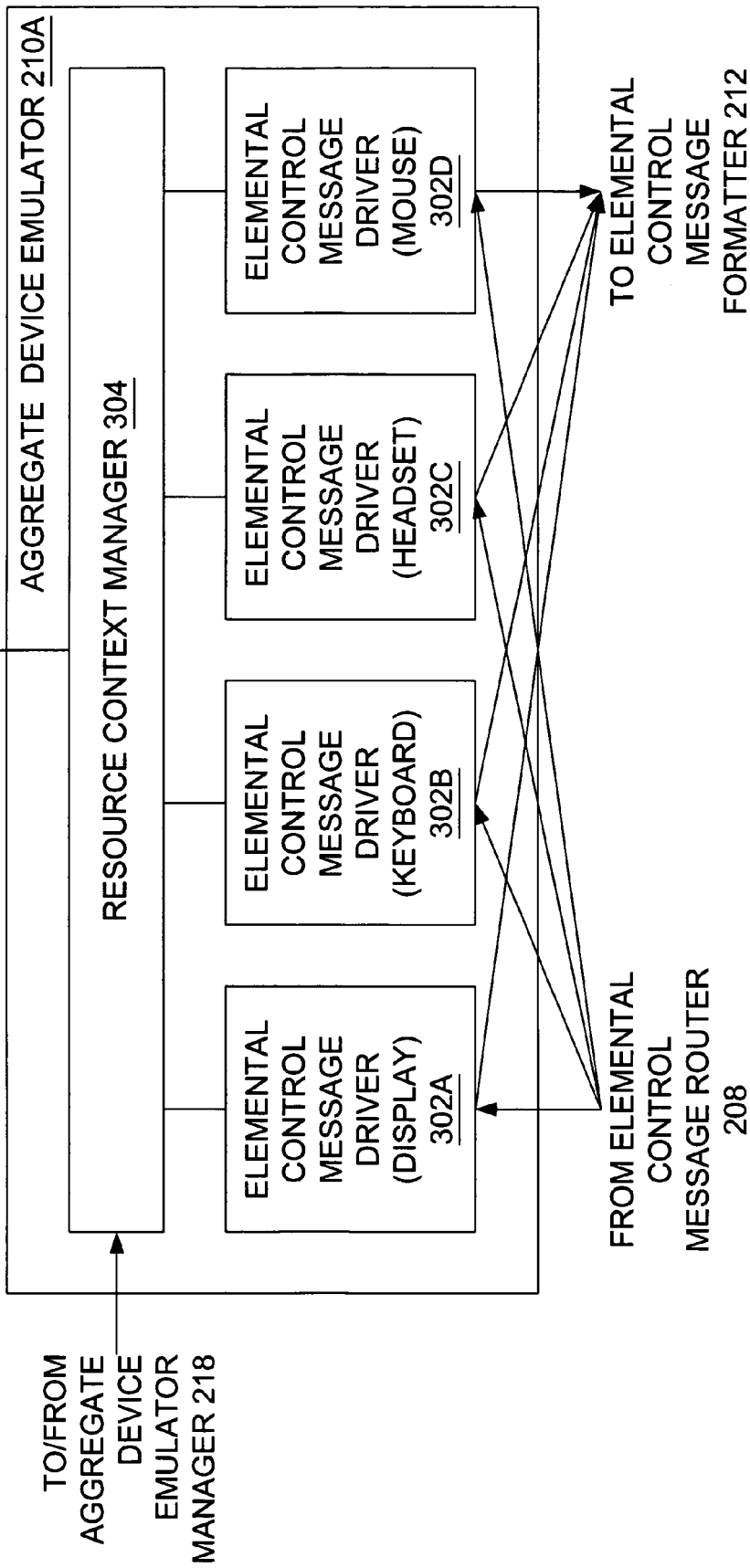
FIG. 3 schematically illustrates elements of a first aggregate device emulator for use in the network intelligence of FIG. 2 in an embodiment of the present invention.

Illustrated in FIG. 3 are elements of a particular aggregate device emulator 210A associated with the stationary workstation 102 (FIG. 1). Included is an elemental control message driver for each of the components of the aggregate device for which the stationary workstation aggregate device emulator 210A is providing control. In particular, included in the stationary workstation aggregate device emulator 210A are an elemental control message driver 302A for the display 108 (FIG. 1), an elemental control message driver 302B for the keyboard 110 (FIG. 1), an elemental control message driver 302C for the stationary headset 111 (FIG. 1) and an elemental control message driver 302D for the mouse 112 (FIG. 1). Each of these elemental control message drivers 302A, 302B, 302C, 302D provides this control through communication with the elemental control message router 208 (FIG. 2) and the elemental control message formatter 212 (FIG. 2). A resource context manager 304 receives input from the aggregate device emulator manager 218 (FIG. 2) and exchanges communication with the elemental control message drivers 302A, 302B, 302C, 302D and a service adapter 216. An example service adapter is a HyperText Transfer Protocol (HTTP) client application (i.e., an Internet browser). As well as communicating with the resource context manager 304, the service adapter 216 may communicate with the server with which it is associated over the data network 106 (FIG. 1) via the protocol processor 206 (FIG. 2).

Figure 4:
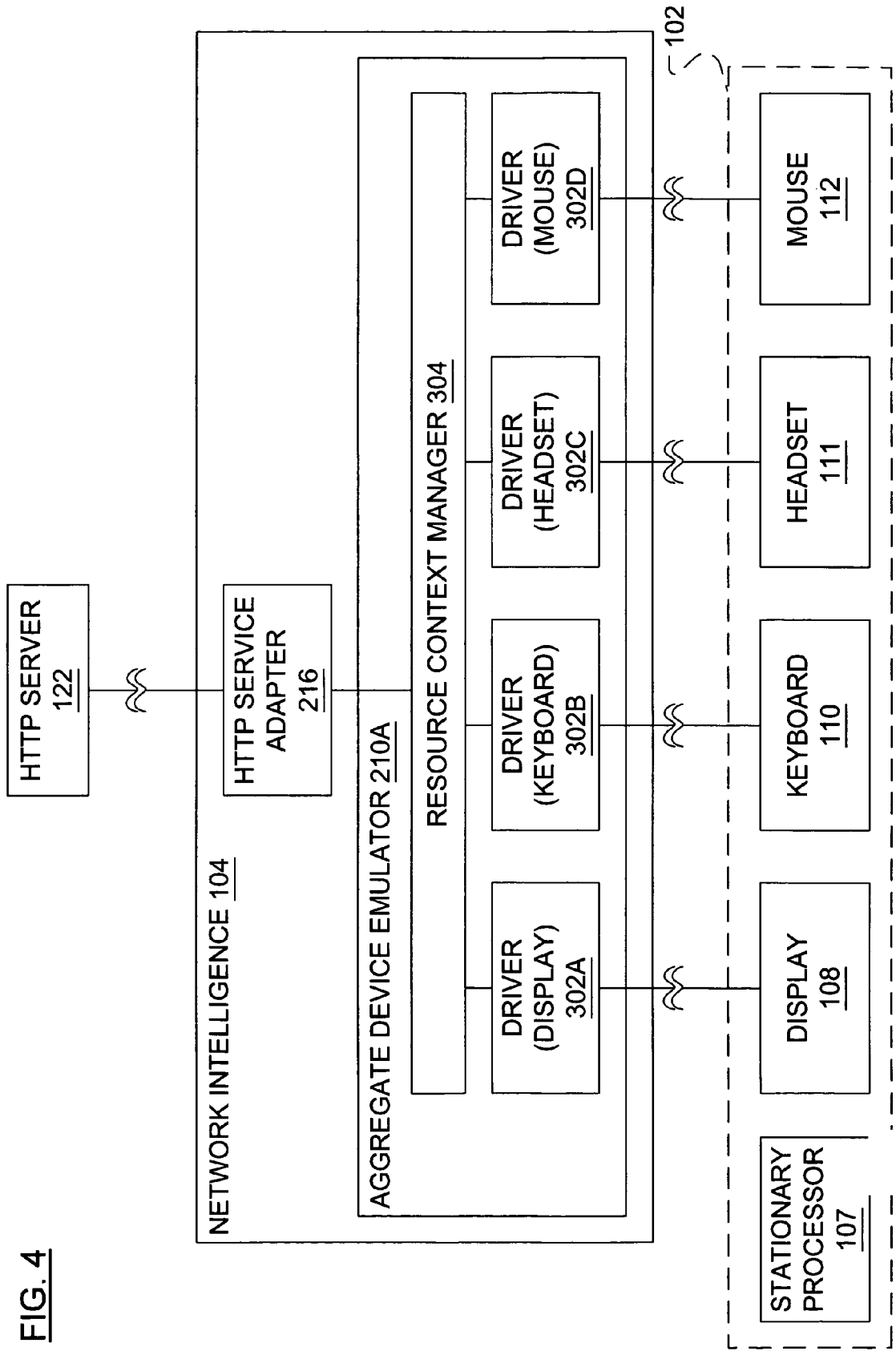
FIG. 4 illustrates functional interaction between a first aggregate device, an aggregate device emulator within a network intelligence and a server in an embodiment of the present invention.

FIG. 4 functionally illustrates interaction between the components of the stationary workstation 102, the network intelligence 104 and the HTTP server 122. The HTTP server 122 is provided here as an exemplary server of a data network service. Although the communication path between the display 108 and the elemental control message driver 302A is not direct, including at least the data network 106 (FIG. 1), the network interface 202 (FIG. 2), the MAC 204 (FIG. 2), the protocol processor 206 (FIG. 2), the message bus 214 (FIG. 2) and the elemental control message router 208 (FIG. 2), the broken connection between the display 108 and the elemental control message driver 302A is illustrative of their functional relationship. Similarly, the broken connections between the keyboard 110 and the elemental control message driver 302B, the stationary headset 111 and the elemental control message driver 302C, the mouse 112 and the elemental control message driver 302D and the service adapter 216 and the HTTP server 122 are indicative of a functional relationship without direct connection. Included among the components of the stationary workstation 102 is a stationary processor 107 for which a state is not maintained in the resource context manager 304.

For operation, a messaging format is required to allow the network intelligence 104 to monitor the components of the stationary workstation 102 and, in reverse, to allow the network intelligence 104 to provide device control to the components of the stationary workstation 102. One messaging format useful in such an application is called Stimulus messaging. Stimulus messaging, in the context of the present invention, refers, in the Server-to-Device case, to messaging where a stimulus message maps to a control of a component of the device. For a stimulus telephone, example components include an indicator lamp (the state of which may be controlled) and a display (the contents of which may be controlled), where the contents may be textual if the display is alphanumeric or images if the display is graphic. In the Device-to-Server case, stimulus messaging refers to a mapping of actions, such as key presses, to stimulus messages. These stimulus messages are exchanged in accordance with an elemental control protocol. One suitable elemental control protocol is detailed in U.S. patent application Ser. No. 09/307, 356 titled "Telephony And Data Network Services At A Telephone", the contents of which are incorporated herein by reference. Another suitable elemental control protocol is the Megaco Protocol. From the Scope of Internet Engineering Task Force (IETF) Request for Comments (RFC) 2885, "Megaco Protocol version 0.8," hereby incorporated herein by reference:

"This document defines the protocol used between elements of a physically decomposed multimedia gateway. There are no functional differences from a system view between a decomposed gateway, with distributed sub-components potentially on more than one physical device, and a monolithic gateway such as described in H.246. This recommendation does not define how gateways, multipoint control units or integrated voice response units (IVRs) work. Instead it creates a general framework that is suitable for these applications."

A Device-to-Server stimulus message typically includes an indication of an event and one or more arguments, where each argument provides detail related to the event, while a Server-to-Device stimulus message typically includes an instruction and one or more arguments on which the instruction may be performed. A typical stimulus message further includes an indication of the origin and the destination of the message. A response message may or may not be sent in the opposite direction indicating success (or failure) in completing the instruction, or a successful (or failed) receipt of the event.

In view of FIG. 4, an Internet browsing session may be described in accordance with the present invention. Typically, an HTTP client application would run on a processor which would send requests to the HTTP server 122 in response to input received from input devices (mouse, keyboard) associated with the processor. Further, the response received from the HTTP server 122 in response to the request would then be interpreted by the service adapter 216 (i.e., the Internet browser application) and output on output devices (display, printer) associated with the processor. In accordance with the present invention, the processor 130 (FIG. 1) of the network intelligence 104 acts as the processor associated with input and output devices at a workstation remote from the network intelligence 104. In particular, a logical model of the stationary workstation 102 is maintained in the network intelligence 104. More specifically, the state of each of the display 108, the keyboard 110, the stationary headset 111 and the mouse 112 is maintained by the stationary workstation aggregate device emulator 210A. This logical association of devices is maintained at the resource context manager 304 and used for communicating with the service adapter 216. In overview, then, the network intelligence 104 communicates with the components of the stationary workstation 102 and, using the stationary workstation aggregate device emulator 210A, represents the stationary workstation 102 to the HTTP server 122.

If it is considered that an Internet browsing session is already underway at the stationary workstation 102, then a HyperText Markup Language (HTML) page is already part of a presentation on the display 108. Movement of the mouse 112 causes movement of a pointer on the display 108. Specifically, movements of the mouse 112 are sent over data network 106 to the network intelligence 104 (FIG. 1) as stimulus messages. These stimulus messages are received by the mouse elemental control message driver 302D and indications of the mouse movement are passed to the resource context manager 304. At the resource context manager 304, these changes in state (movements) of the mouse 112 are monitored and used to update the state of the display 108, i.e., the location of the pointer, in the logical model. The new state of the display 108 is then passed to the display elemental control message driver 302A where stimulus messages representative of the new state are generated and sent to the display 108. Alternatively, the mouse 112 and the display 108 may be physically connected and act as a single device. In this alternative, the display 108 would update the position of the pointer based on movements of the mouse 112 directly, i.e., without the intervention of the network intelligence 104. Such a single device may be triggered to send a stimulus message to the network intelligence representative of a mouse click event. The stimulus message would include the coordinates of the pointer at the time of the mouse click event.

In some cases, a single physical device may be represented to the resource context manager 304 as multiple logical device elements. For instance, a touch screen (such as those in use in Palm™ devices marketed by Palm Inc., of Santa Clara, Calif., and other personal digital assistants) may be used for presenting output to a user and receiving input from a user. Each of the two functions of this single physical device would be represented to the resource context manager 304 as a separate logical device element, for example, a display (output device) and a touch screen (input device), where an elemental control message driver would exist in the network intelligence for each device.

Consider that movements of the mouse 112 have resulted in the pointer being positioned, as shown on the display 108, over a hyperlink that identifies, say, the HTTP server 122 and directory information specifying a particular HTML file by location on the HTTP server 122. Upon an event, such as the clicking of a button on the mouse 112, stimulus messages representative of the event are sent to the mouse elemental control message driver 302D. The event is then indicated by the mouse elemental control message driver 302D to the resource context manager 304, which passes an indication of the event to the service adapter 216. The service adapter 216, as mentioned hereinbefore, is an HTTP client application and is therefore associated with HTTP services such as those provided by the HTTP server 122. Receipt of the indication of the event by the HTTP service adapter 216 triggers interpretation of the indication and generation, based on the interpretation, of a request for the particular HTML file. The HTTP service adapter 216 then sends the request to the HTTP server 122.

Upon receiving the request, the HTTP server 122 responds by sending the particular HTML file to the network intelligence 104 where the file is received, indirectly, by the HTTP service adapter 216, which interprets the HTML code and sends data objects to the resource context manager 304. Typical of these data objects would be data objects representative of text or images, although the data objects may be representative of streaming media such as audio or video. In the case of text or images, the data objects would include drawing instructions to be interpreted by an application programming interface (API) of the resource context manager 304 for updating the state of the display 108. The resource context manager 304 then changes the state of the logical model of the aggregate device that includes the display 108 and communicates this change to the display elemental control message driver 302A. The display elemental control message driver 302A translates the change into stimulus messages and these messages are sent to the actual display element 108. At the display 108, the stimulus messages are received and the presentation on the display 108 is updated.

Like a typical browser application, the service adapter 216 may include interpretation capability beyond that of HTML code. For instance, the service adapter 216 may have a capability to execute a Java™ virtual machine or interpret Extensible Markup Language (XML), and may have a capability to support plug-ins that enable new functionality to be added, as is known in the context of Netscape Navigator™.

Components of a given aggregate device may have a limited capability for handling media. It is the task of the network intelligence 104 to orchestrate delivery of media to a compatible device component. An audio input component of a first aggregate device may, for example, be connected to an audio output component of a second aggregate device in response to commands processed by a service adapter and presented to an aggregate device emulator (an example of this is basic peer-to-peer media streaming). To achieve this in a more general context, two conditions should be met. In the first condition, there is a requirement that the command protocol between the service adapter and a server associated with the service adapter allows for direction of the flow of data objects or media to addresses other than those of the server and the service adapter. In the second condition, there is a requirement that the flow of data objects or media is compatible with the device component. SIP and the Megaco Protocol are examples of control protocols that meet the first condition. The existing HTML protocol does not meet the first condition. The second condition can be met by enabling compatibility of an aggregate device component with a specific media format by providing a processing algorithm for the specific media format, for instance, by dynamically downloading the processing algorithm. The second condition can also be met by processing the flow at some intermediate point to transform its format into a different format compatible with the device component in question.

In the case where the first condition is not met, media processing must take place at the network intelligence 104. For instance, an audio output component may have a capability for handling audio in Adaptive Differential Pulse Code Modulation (ADPCM) format. Digital audio from a data network service arriving at the network intelligence 104 may be translated from the format in which the audio arrives at the network intelligence 104 (for example, MPEG-1 Audio Layer-3 or RealAudio™) to the format understood by the audio output component, which, in the example case above, is ADPCM. Similarly, images arriving at the network intelligence 104 may be translated from the format in which the images arrive (such as JPEG or GIF) to a format understood by a display component (such as BMP).

Where the first condition is met, the translation can take place somewhere other than the network intelligence 104, under control of the relevant service adapter, in which case the flow of data objects or media can be routed to the device component without passing through the network intelligence 104. This translation elsewhere than the network intelligence 104 may also be performed on a combination of media streams, and the retransmission of the combination, as would typically be the case in a conferencing application.

Figure 5:
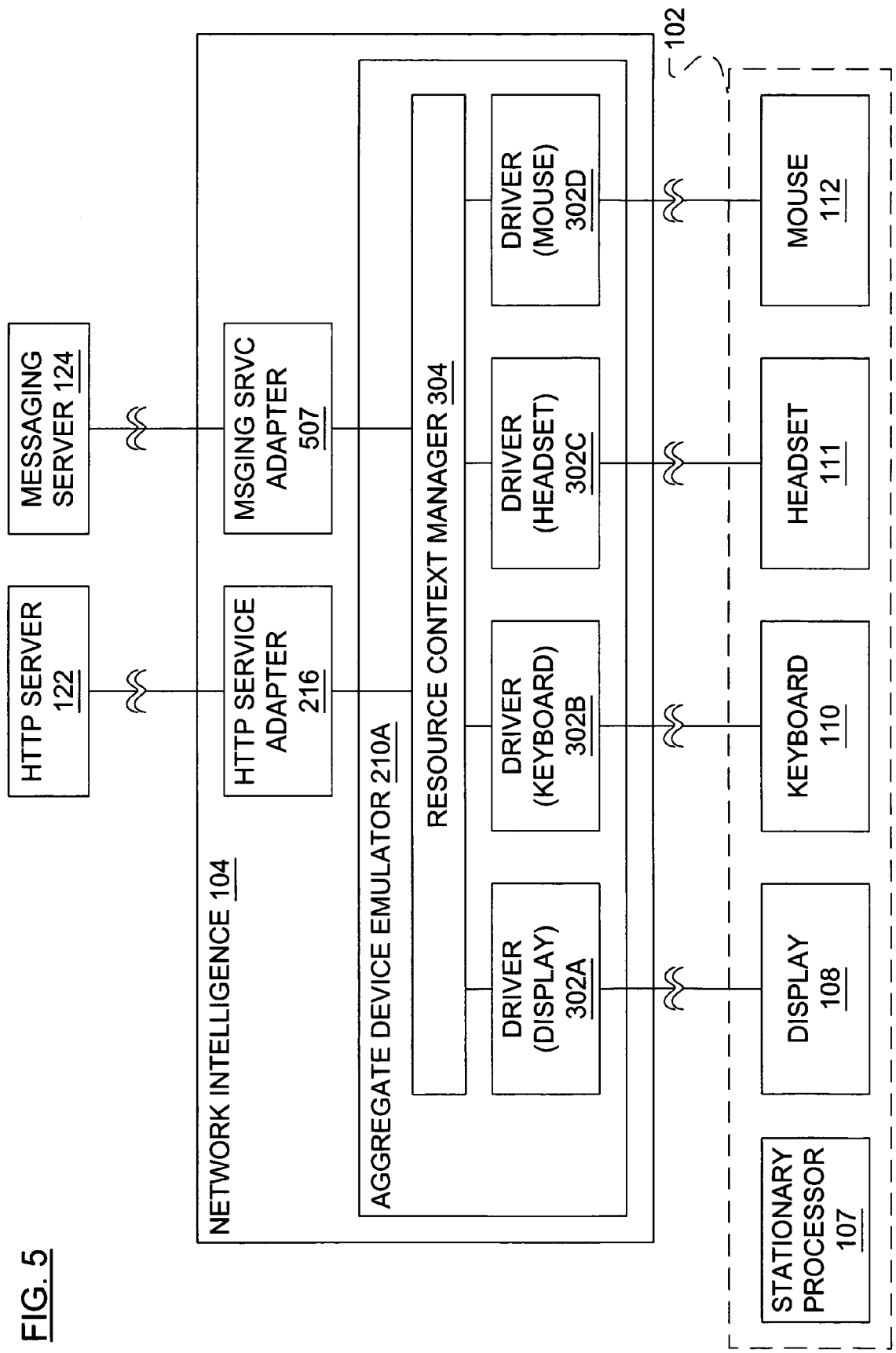
FIG. 5 illustrates functional interaction between the first aggregate device, an aggregate device emulator within a network intelligence and two servers in another embodiment of the present invention.

The example illustrated in FIG. 4 may be extended as illustrated in FIG. 5, wherein a second service adapter 507 is associated with the stationary workstation aggregate device emulator 210A. There exist many ways in which a new service adapter may be installed and configured in a network intelligence and associated with an aggregate device emulator. The second service adapter 507 provides additional capabilities to the stationary workstation 102, for example, messaging services from the messaging server 124. Multiple instances of service adapting applications may run on the network intelligence 104 and, as such, the resource context manager 304 takes on the additional role of logically associating particular instances of these applications (i.e., the service adapters 216, 507) with a logical model of a single aggregate device (i.e., the logical model of the stationary workstation 102). In the FIG. 5 example, a user may have two applications visible on the display 108, such as an Internet browsing application and an e-mail sending/receiving application. Further, the user may select one of the applications as the active application according to a set of visibility rules. Alternatively, only one of these applications may be visible at one time. A further role of the resource context manager 304, then, is to maintain the state of each of the components of the stationary workstation 102 in relation to both applications and enforce the required visibility rules necessary to share the components with both applications. The visibility rules may not be known to the individual service adapters 216, 507.

Figure 6:
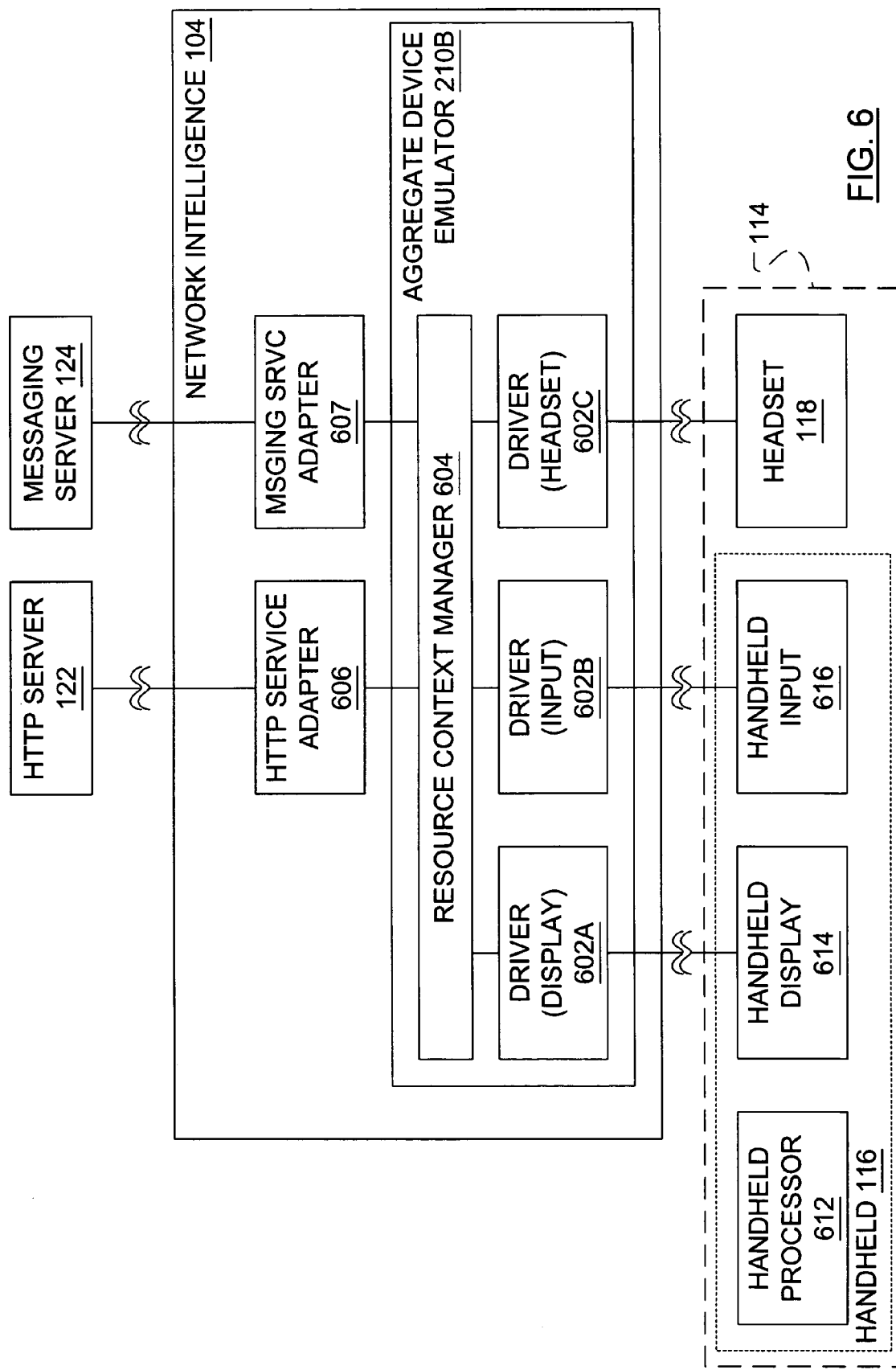
FIG. 6 illustrates functional interaction between a second aggregate device, an aggregate device emulator within a network intelligence and two servers in a further embodiment of the present invention.

In a further example, presented in conjunction with FIG. 6, the aggregate device emulator 210B is associated with the mobile workstation 114. Although, in FIG. 1, the mobile workstation 114 is shown as comprising two components, namely the handheld computing device 116 and the mobile headset 118, from the perspective of the network intelligence 104, and more particularly the mobile workstation aggregate device emulator 210B, the logical model of the mobile workstation 114 comprises three components, namely a handheld display 614, a handheld input device 616 and the mobile headset 118. Where the handheld computing device 116 is, for example, a Palm™ device, the handheld input device 616 may be an integral device such as a touch screen or a peripheral device such as a keyboard. The mobile workstation aggregate device emulator 210B, as shown, includes a resource context manager 604 in communication with, for example, an HTTP service adapter 606 that is associated with the HTTP server 122 and a messaging service adapter 607 that is associated with the messaging server 124. The resource context manager 604 is also in communication with an elemental control message driver 602A that is associated with the handheld display 614, an elemental control message driver 602B that is associated with the handheld input device 616 and an elemental control message driver 602C that is associated with the mobile headset 118. As in the case of a user at the stationary workstation 102, presentation to a user at the mobile workstation 114 of data network services from the HTTP server 122 and the messaging server 124 may be arbitrated by the resource context manager 604.

It is notable that, because only the logical model of the mobile workstation 114 is presented to the service adapters 606, 607 by the aggregate device emulator 210B, the service adapters 606, 607 may be unaware of the different physical devices actually used to present the service to the user at the mobile workstation 114. Therefore, the service adaptation logic in this example may be identical to the logic used in the previous or other examples. As well, the components in use at a particular time by a particular user of the services in question may change without affecting the service adaptation logic in use at the corresponding service adapters.

Figure 7:
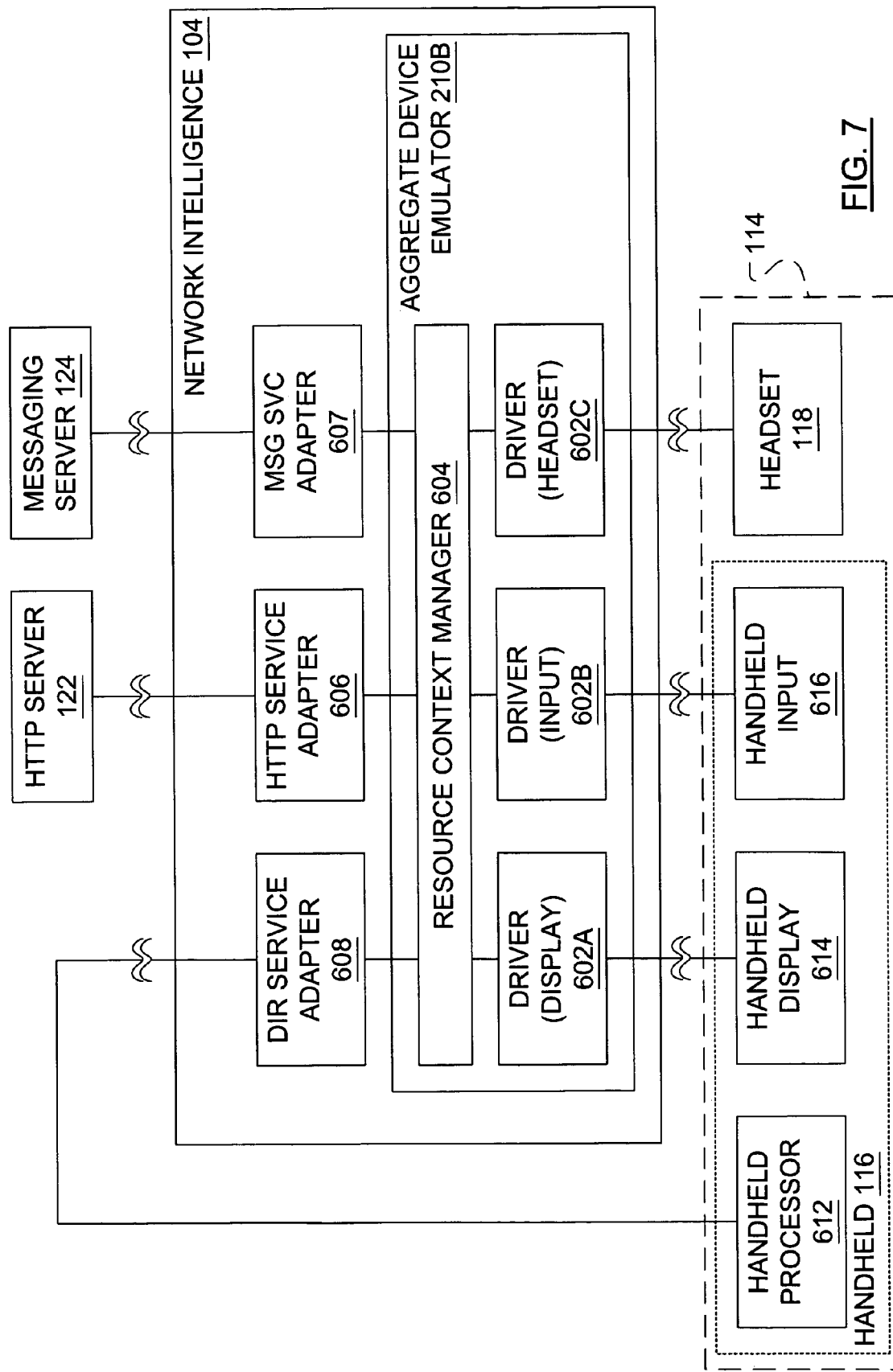
FIG. 7 illustrates functional interaction between the second aggregate device, an aggregate device emulator within a network intelligence and two servers in a still further embodiment of the present invention.

It is also notable that, although the handheld computing device 116 includes a handheld processor 612, from the perspective of the mobile workstation aggregate device emulator 210B the mobile workstation 114 includes only stimulus devices and thus is incapable of running applications. It may be that a user of the mobile workstation 114 is interested in utilizing applications that run on the handheld processor 612 and, as such, an architecture is presented in FIG. 7 that allows the user to utilize these applications. With the addition of a third service adapter 608, specifically for communicating with handheld processor 612, the capabilities of a typical handheld computing device may be provided by the network intelligence 104 to a user of the handheld computing device 116. For instance, if a user normally maintains an address book on the handheld computing device 116, the third service adapter 608 may be an address book client application that allows the user to query the handheld processor 612 to retrieve addresses and/or phone numbers of contacts that are stored in a memory (not shown) of the handheld computing device 116.

Figure 8:
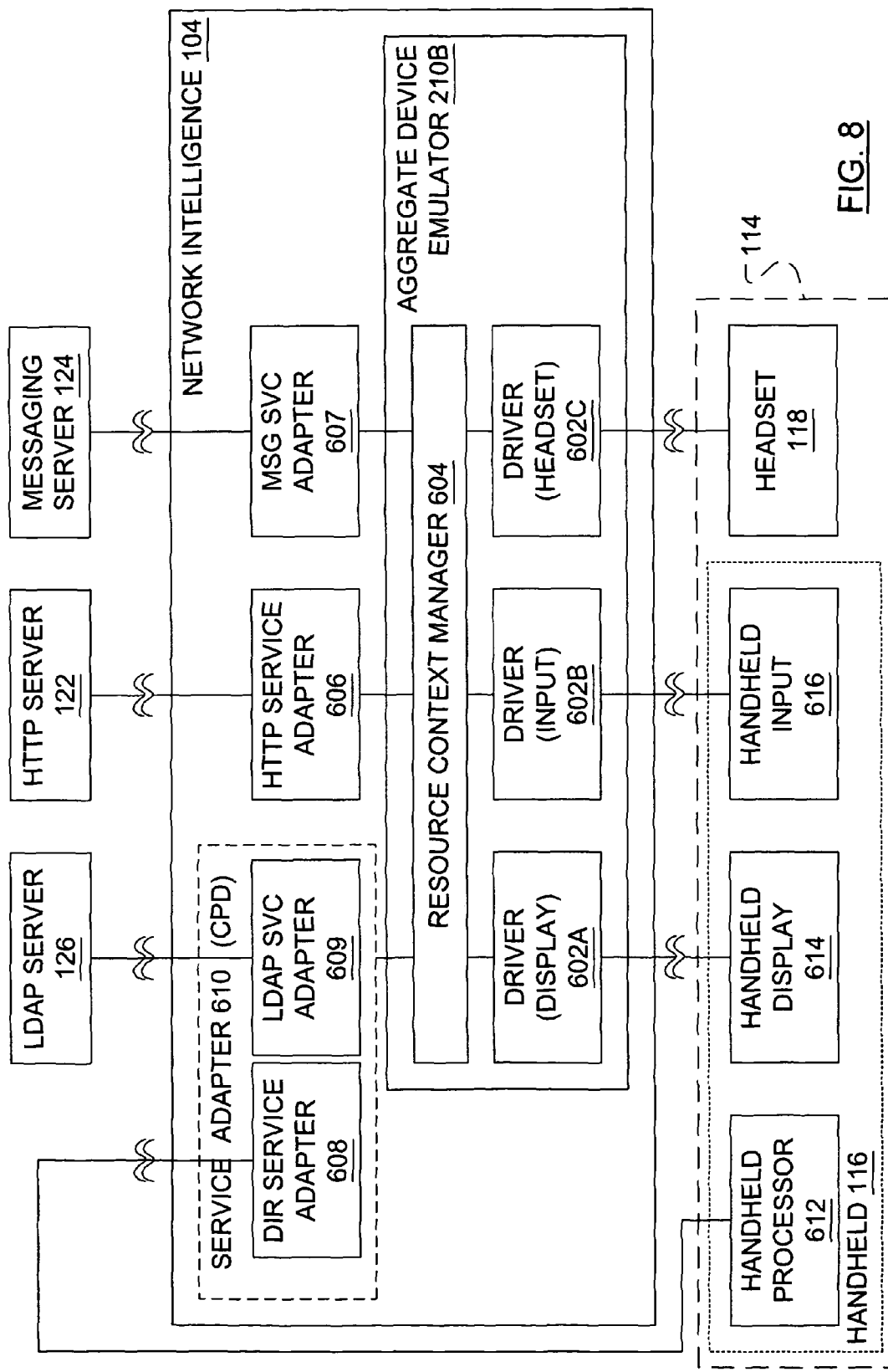
FIG. 8 illustrates functional interaction between the second aggregate device, an aggregate device emulator within a network intelligence and three servers in an embodiment of the present invention.

Although the user of the handheld computing device 116 may have, for example, an extensive address book maintained by an application executed on the handheld processor 612, there may be instances in which a larger directory is required. A protocol such as the Lightweight Directory Access Protocol (LDAP) may be used to query the directory server 126 for specific entries. If a user is to have access to the directory server 126, the network intelligence 104 will need a fourth service adapter 609 as shown in FIG. 8. Since the actions of the directory query service adapters 608, 609 are related, the two service adapters 608, 609 may be combined in a compound directory service adapter 610. The compound directory service adapter 610 may receive an indication of a directory query from the mobile workstation aggregate device emulator 210B and, either in series or parallel, query each of the handheld processor 612 and the directory server 126.

Address information resulting from such queries may be received by the compound directory service adapter 610 and interpreted by the appropriate one of the two service adapters 608, 609. This interpretation may include combining the address information into a single address list and generating presentation instructions. Data objects representative of these presentation instructions are then passed to the resource context manager 604. Stimulus messages controlling the handheld display 614 are then sent from the handheld display elemental control message driver 602A to the handheld display 614 where the messages are processed and the display updated to present the combined list.

If the mobile headset 118 has a connection to the data network 106 (FIG. 1) which is separate from the connection maintained between the handheld computing device 116 and the data network 106, the user of the mobile headset 118 could be physically distant from the handheld computing device 116 and yet still perform a directory query of the address book maintained at the handheld computing device 116. It is also possible under these conditions for the handheld display 614 to be updated remotely, for example, as a result of user actions or service interactions, even though the handheld computing device 116 (that includes the handheld display 614) is physically distant from the user. It should be readily apparent from this example that these same principals can be applied to allow any physical device component of the aggregate device model to be geographically distributed arbitrarily across the data network, and that end-user devices containing information or applications utilized by the service adapters may also be distributed arbitrarily across the data network.

Further, it is also possible for the headset message driver 602C of the mobile workstation aggregate device emulator 210B to be designed, for example, to accept speech input, implementing speech recognition internally to headset message driver 602C, and representing the speech input from the user as a different logical input device type, through the resource context manager 604 to the compound directory service adapter 610. For example, voice commands may be spoken by the user and interpreted by the headset message driver 602C as display movement commands (e.g., "up", "left", "select"). The headset message driver 602C may thus represent the mobile headset 118, to the resource context manager 604, as a logical pointing device. The resource context manager 604 may then incorporate this logical pointing device into the logical aggregate device model it maintains and present this to the compound directory service adapter 610 and any other service adapters using the mobile workstation aggregate device emulator 210B. Thus, service adaptation logic in a given service adapter may be able to make use of a logical device element ("pointing device") that is different from the physical device component ("microphone"). The service adaptation logic may not be aware of these differences between logical and physical representation.

Figure 9:
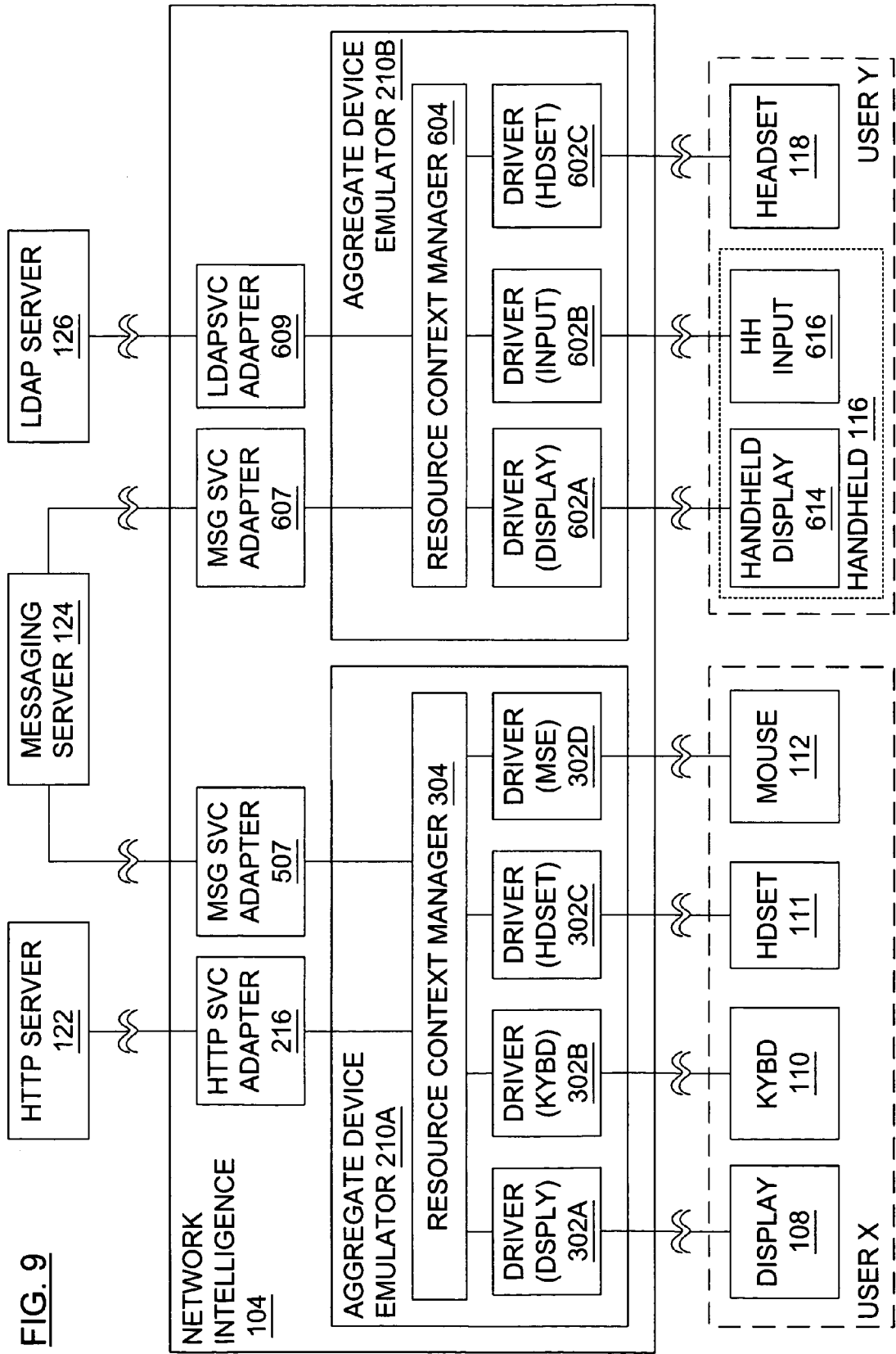
FIG. 9 illustrates functional interaction between two aggregate devices, two aggregate device emulators within a network intelligence and three servers in an embodiment of the present invention.

The illustration of FIG. 9 is presented to reiterate that the network intelligence 104 may run multiple instances of aggregate device emulators, each with elemental control message drivers, resource context managers and associated service adapters. For instance, the network intelligence 104 may provide, through the stationary workstation aggregate device emulator 210A, HTTP services from HTTP server 122 to the stationary workstation 102 operated by a user X and, through the mobile workstation aggregate device emulator 210B, directory services from the LDAP server 126 to the mobile workstation 114 operated by a user Y. Notably, the messaging service adapter 507 associated with the stationary workstation aggregate device emulator 210A and the messaging service adapter 607 associated with the mobile workstation aggregate device emulator 210B provide access to the messaging server 124 to both user X and user Y. Further, due to the logical device model representation by the respective aggregate device emulators 210A, 210B, the service adapters 507, 607 may be unaware of the components used by user X and user Y, and therefore the service adaptation logic in use at each of the service adapters 507, 607 may be identical.

The network intelligence 104 running multiple instances of aggregate device emulators 210 may be serving multiple users or multiple "views" of aggregate devices available to a single user.

Figure 10A:
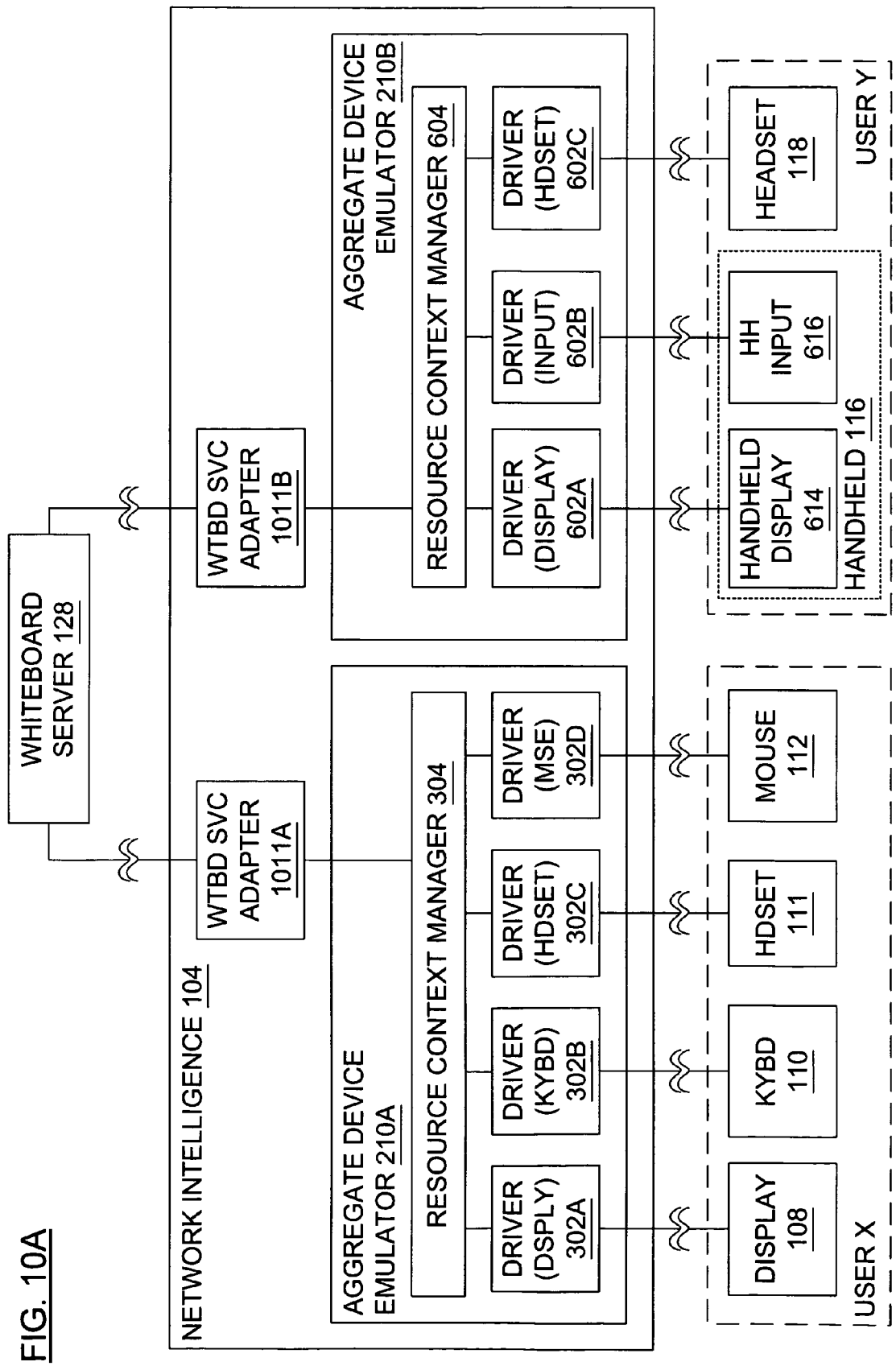
FIG. 10A illustrates functional interaction between two aggregate devices, two aggregate device emulators within a network intelligence and a server in an embodiment of the present invention.

FIG. 10A presents an architecture for the network intelligence 104 that allows collaboration services to be used by a user X and a user Y. The whiteboard server 128 is an example of a server which may provide such collaboration services. As is typical, the whiteboard server 128 receives input from a number of users' devices and updates a shared display (a whiteboard) to reflect this input. An exemplary whiteboard server is provided by Microsoft™ of Redmond, Wash. under the name NetMeeting™. In FIG. 10A, each aggregate device emulator 210A, 210B is associated with a separate instance of a service adapter 1011A, 1011B specific to the whiteboard server 128. The whiteboard server 128 arbitrates input received from the user X-associated service adapter 1011A and the user Y-associated service adapter 1011B and communicates an updated shared display to the two service adapters 1011A, 1011B.

Figure 10B:
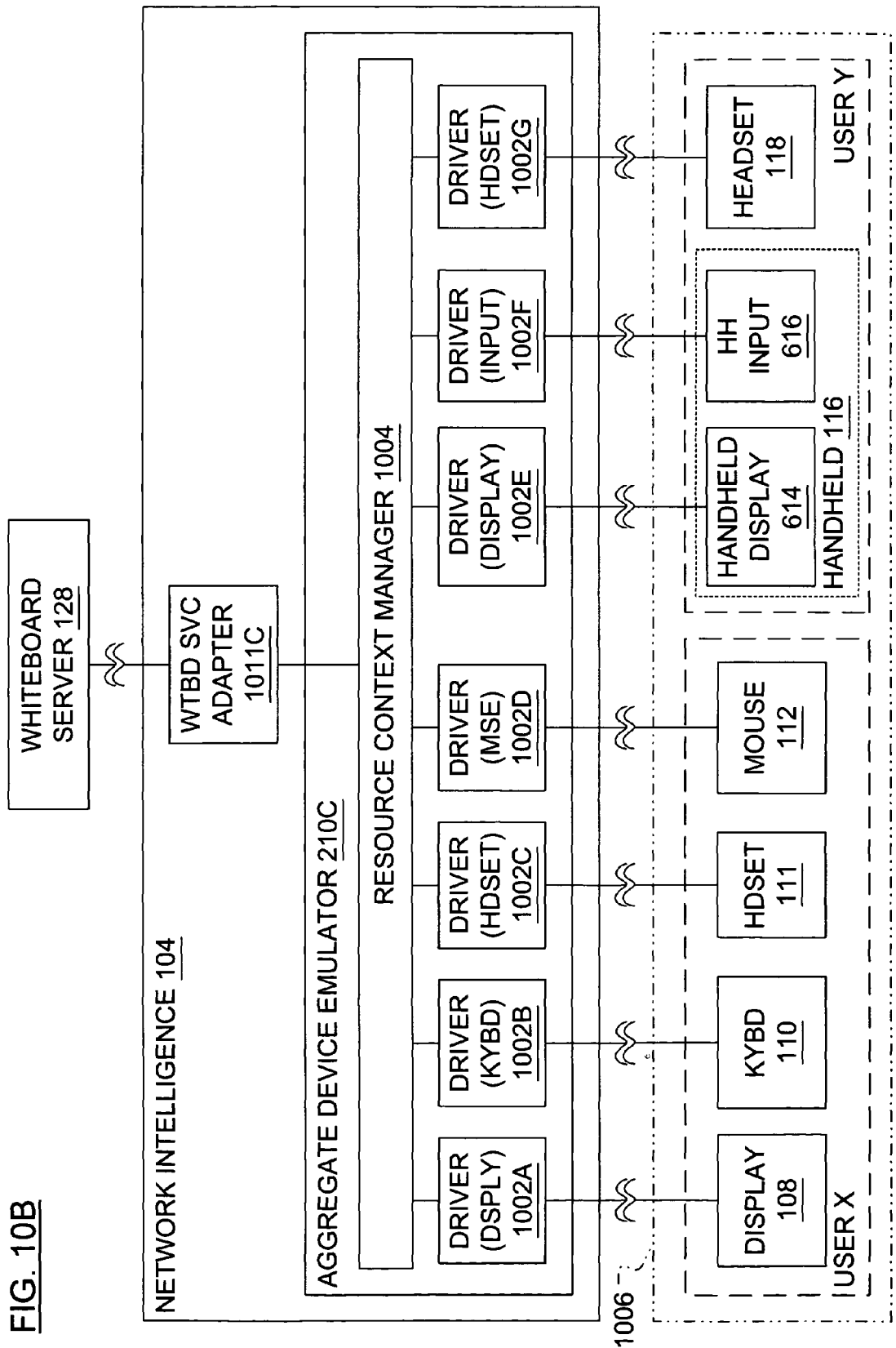
FIG. 10B illustrates functional interaction between an aggregation of aggregate devices, an aggregate device emulator within a network intelligence and a server in an embodiment of the present invention.

In FIG. 10B, an alternative network intelligence architecture is presented for providing collaborative data services from the exemplary whiteboard server 128. The aggregate device emulator 210C logically associates all of the components available to user X (at stationary workstation 102) and all of the components available to user Y (at mobile workstation 114) in a single logical model of a combined user device 1006. The logical model is then presented to a multi-user whiteboard service adapter 1011C. The combined aggregate device emulator 210C includes an elemental control message driver for each of the devices included in the combined user device 1006 and a resource context manager 1004. Specifically, an elemental control message driver 1002A is associated with the display 108, an elemental control message driver 1002B is associated with the keyboard 110, an elemental control message driver 1002C is associated with the stationary headset 111, an elemental control message driver 1002D is associated with the mouse 112, an elemental control message driver 1002E is associated with the handheld display 614, an elemental control message driver 1002F is associated with the handheld input device 616 and an elemental control message driver 1002G is associated with the mobile headset 118.

Input, say from the keyboard 110, may be received by the keyboard elemental control message driver 1002B and passed to the resource context manager 1004 from which the input is passed to the multi-user whiteboard service adapter 1011C. The input is then interpreted by the multi-user whiteboard service adapter 1011C and messages representative of the input are sent to the whiteboard server 128 where they may be interpreted as an update to the shared whiteboard. These updates are then communicated back from the whiteboard server 128 to the network intelligence 104. The multi-user whiteboard service adapter 1011C interprets the updates and sends display update commands to the resource context manager 1004, which alters a logical model of the shared whiteboard and forwards the changes to the display 108 and the handheld display 614 via respective elemental control message drivers 1002A, 1002E. Thus, the changes may be observed by user X on the display 108 and by user Y on the handheld display 614. Advantageously, the resource context manager 1004 need only maintain the state of a single display in the logical model of the combined user device 1006 while communicating changes in that logical display to both the display 108 and the handheld display 614 via the respective elemental control message drivers 1002A, 1002E. The multi-user whiteboard service adapter 1011C may represent input from input devices associated with the different users as originating from different functional devices, even though a common logical model is maintained for the combined user device 1006.

Thus far, description of the present invention has concentrated on the functional interaction between aggregate device components, the network intelligence 104 and various servers. It has been observed that the workstation components are typically represented as "dumb" devices (the display 108, the keyboard 110, the stationary headset 111, the mouse 112) but may be somewhat intelligent, as in the case of the handheld computing device 116. Further, preferred messaging types, namely the known stimulus messaging scheme and the Megaco Protocol, have been proposed. Although the components of the stationary workstation 102 are shown as individually connected to the data network 106, and such "network ready" devices may exist, common device components may require an intermediate device to allow the present invention to operate properly.

Turning to FIG. 11, a frame buffer processor 1108 is provided between the data network 106 and the display 108 of the stationary workstation 102. Such devices as the frame buffer processor 1108 are known. In the exemplary stimulus messaging case, stimulus messaging arrives at the frame buffer processor 1108 from the network intelligence 104 (FIG. 1) and is converted to RGB signals for controlling the state of the display 108. The keyboard 110 may be a Universal Serial Bus (USB) device. As such, there is a requirement for an apparatus to allow the connection of a USB device to the data network 106. Such an apparatus is described by McAlear, et al, in U.S. patent application Ser. No. 09/386,215, "USB Networking on a Multiple Access Transmission Medium," hereby incorporated herein by reference. If the data network 106 includes an Ethernet LAN, a USB/Ethernet interface 1106 may be provided in accordance with the McAlear patent application. The USB/Ethernet interface 1106 would receive stimulus messaging in Ethernet packets and route stimulus messages from the keyboard 110 to the network intelligence 104 (FIG. 1) over the data network 106.

It may be that a component of the stationary workstation 102, such as the mouse 112, is "Ethernet-ready," which is to say that the component is addressable and can send and receive Ethernet packets. If the mouse 112 is Ethernet-ready, then an interface such as the USB/Ethernet interface 1106 may not be necessary and the mouse 112 may be directly connected to the data network 106 for exchanging stimulus messages with the network intelligence 104 (FIG. 1).

Figure 12:
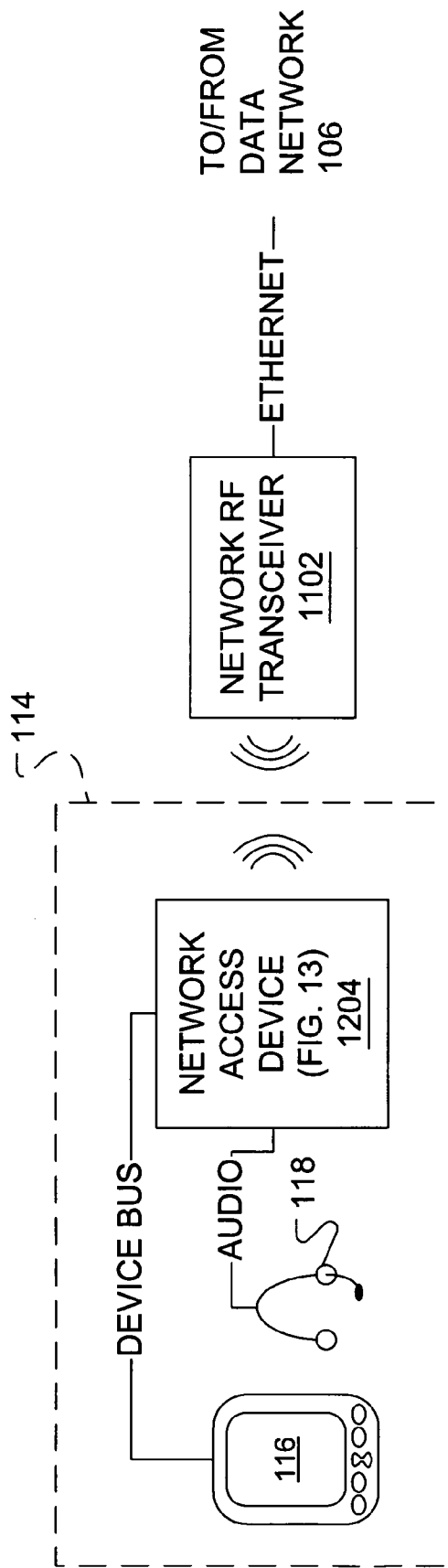
FIG. 12 illustrates connections between components of the second aggregate device and the network of FIG. 1.

As will be appreciated, access to the data network 106 need not be wireline. The stationary headset 111 is shown in FIG. 11 as exchanging stimulus messages as wireless packets (an example being IP over IEEE 802.11) with a network RF transceiver 1102. Such devices as the network RF transceiver 1102 are known and may use a technology such as Bluetooth™. FIG. 12 illustrates all of the components of the mobile workstation 114 accessing the data network 106 wirelessly using radio frequency (RF) signals. Wireless communication need not imply RF communication as infra red (for example, using the IrDA Protocol) communication is similarly useful. A network access device 1204 for wirelessly transmitting and receiving network traffic and routing stimulus messaging to appropriate devices is described in further detail in conjunction with FIGS. 13A and 13B.

Figure 13A:
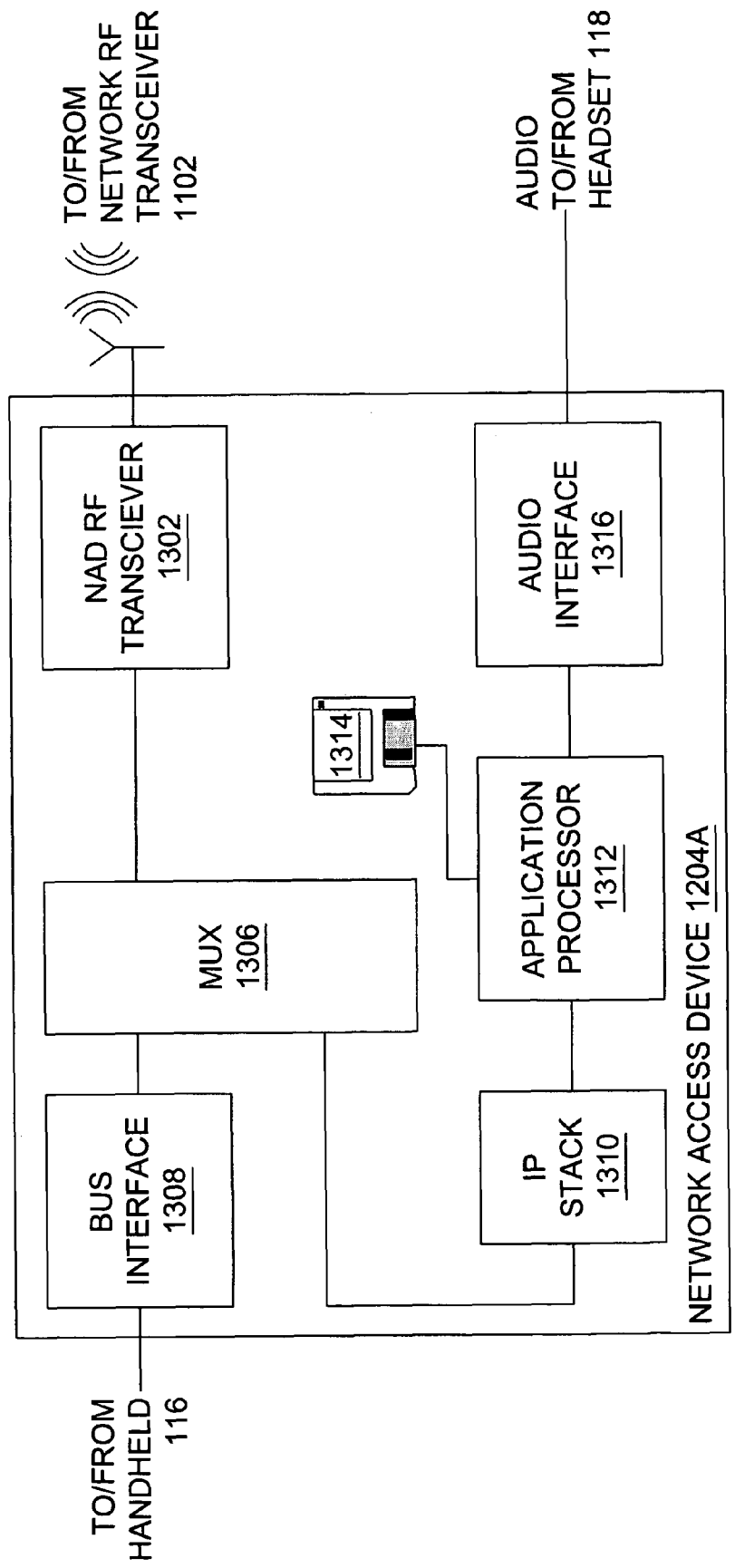
FIG. 13A schematically illustrates elements of a network access device for use in a wireless connection to the data network of FIG. 1 in an embodiment of the present invention.

FIG. 13A illustrates a network access device 1204A, exemplary of the network access device 1204 (FIG. 12), that may be a peripheral device specifically designed to inter-work with the handheld computing device 116. Exemplary handheld computing devices often run the WindowsCE™ operating system and have a capability to accept various peripheral devices such as a modem or a keyboard. This capability may be exploited in the future to allow the handheld computing devices to accept as yet undeveloped peripheral devices. A NAD (network access device) RF transceiver 1302 may be used for communication with the network RF transceiver 1102 (FIG. 12). The NAD RF transceiver 1302 connects to a multiplexer (MUX) 1306. The MUX 1306 serves to distinguish network traffic destined for the handheld computing device 116 from network traffic destined for the mobile headset 118 or the data network 106 (FIG. 1) and may also be called a router or a switch.

Network traffic destined for the mobile headset 118 is directed to a series of functions specifically for communication with the mobile headset 118. Where the communication with the mobile headset 118 employs the Internet Protocol for transporting both control and media streams, IP packets are processed by an IP stack 1310 as known. Exemplary protocols for such communication include the Real Time Protocol (RTP) for transporting media streams in IP packets and the Megaco Protocol for transporting control information in IP packets.

The IP stack 1310 is in communication with an application processor 1312 which acts to translate the data received from the IP stack 1310 to audio signals and vice versa. The application processor 1312 may be loaded with digital audio communication software from a software medium 1314, which could be a disk, a tape, a chip or a random access memory containing a file downloaded from a remote source. As the data network 106 may not always be available to the application processor 1312, it is preferable that the application processor 1312 be capable of selectively addressing packets to either the bus interface 1308 or the NAD RF transceiver 1302. Similarly, it is preferable that the MUX 1306 be capable of routing traffic from the application processor 1312 to the handheld computing device 116 via the bus interface 1308. Audio signals are exchanged between the application processor 1312 and an audio interface 1316. The audio interface 1316 may include, for example, a ⅛" jack for a combination earphone and microphone unit (the mobile headset 118). Such jacks are commonly found on cordless telephones and cellular telephones.

Network traffic destined for the handheld computing device 116 is directed by the MUX 1306 to a bus interface 1308 which is in communication with the handheld computing device 116. Specifically, the bus interface 1308 serves to distinguish between stimulus messaging to or from the stimulus components of the handheld computing device 116, namely the handheld display 614 (FIG. 6) and the handheld input device 616 (FIG. 6), and the network traffic to or from the handheld processor 614 (FIG. 6).

Figure 13B:
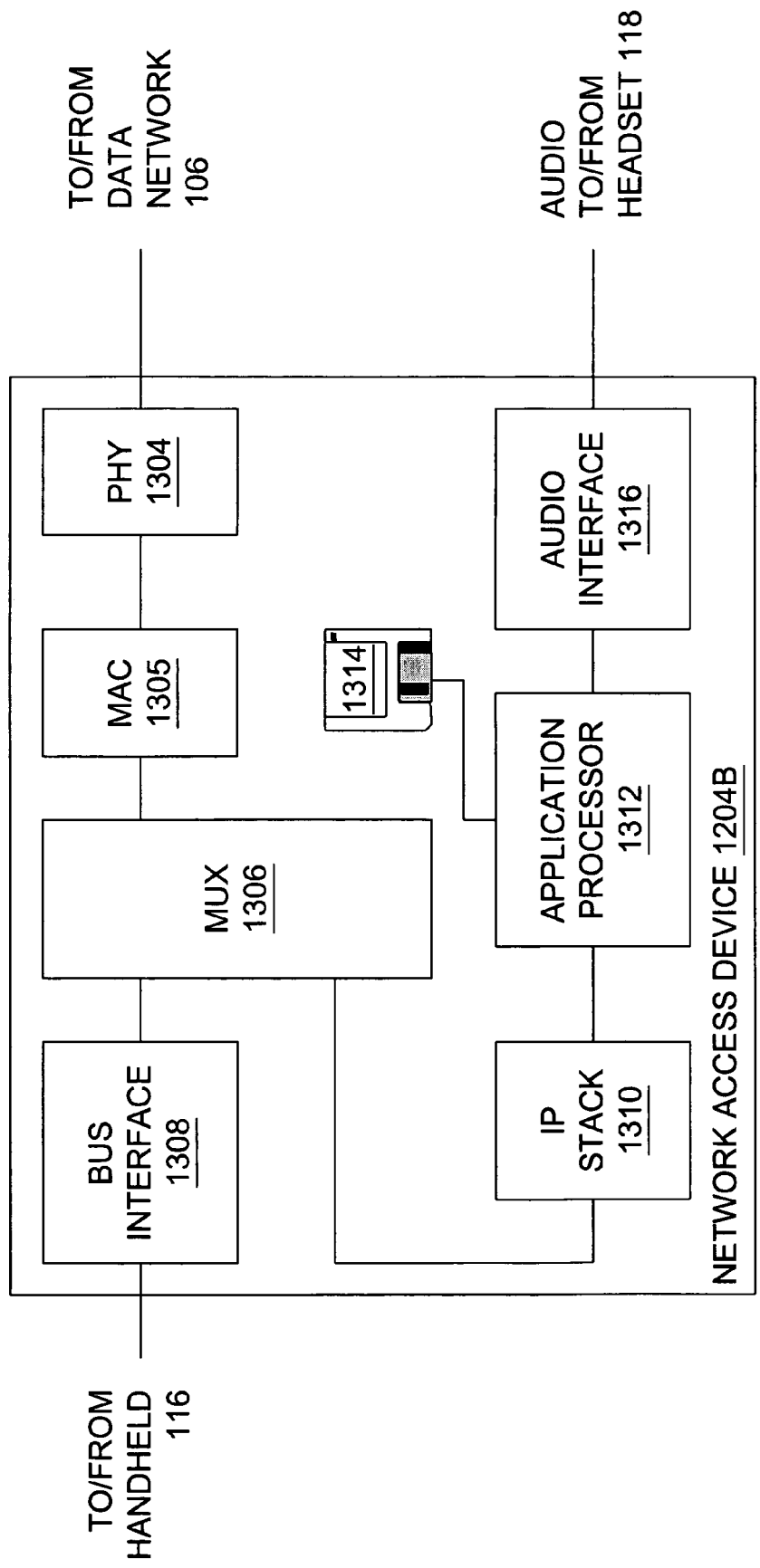
FIG. 13B schematically illustrates elements of a network access device for use in a wireline connection to the data network of FIG. 1 in an embodiment of the present invention.

An alternative network access device 1204B is illustrated in FIG. 13B and designed to connect to the data network 106 (FIG. 1) over an Ethernet link. A physical network interface (PHY) 1304 is provided to send and receive over this Ethernet link. PHY 1304 connects to a medium access controller (MAC) 1305 which subsequently connects to the MUX 1306. The remaining function of the alternative network access device 1204B is described above in conjunction with the description of the network access device 1204A.

As described above, stimulus components as part of an aggregate device may have a media handling capability. These stimulus components may also have a capability to communicate directly with other network connected devices, given enough instruction from the network intelligence 104. A stimulus device or an aggregate device, under control of the network intelligence 104, may thus present itself to a data network server as a device with inherent intelligence, yet not contain that intelligence itself, rather acting as a proxy for the network intelligence 104.

Figure 14:
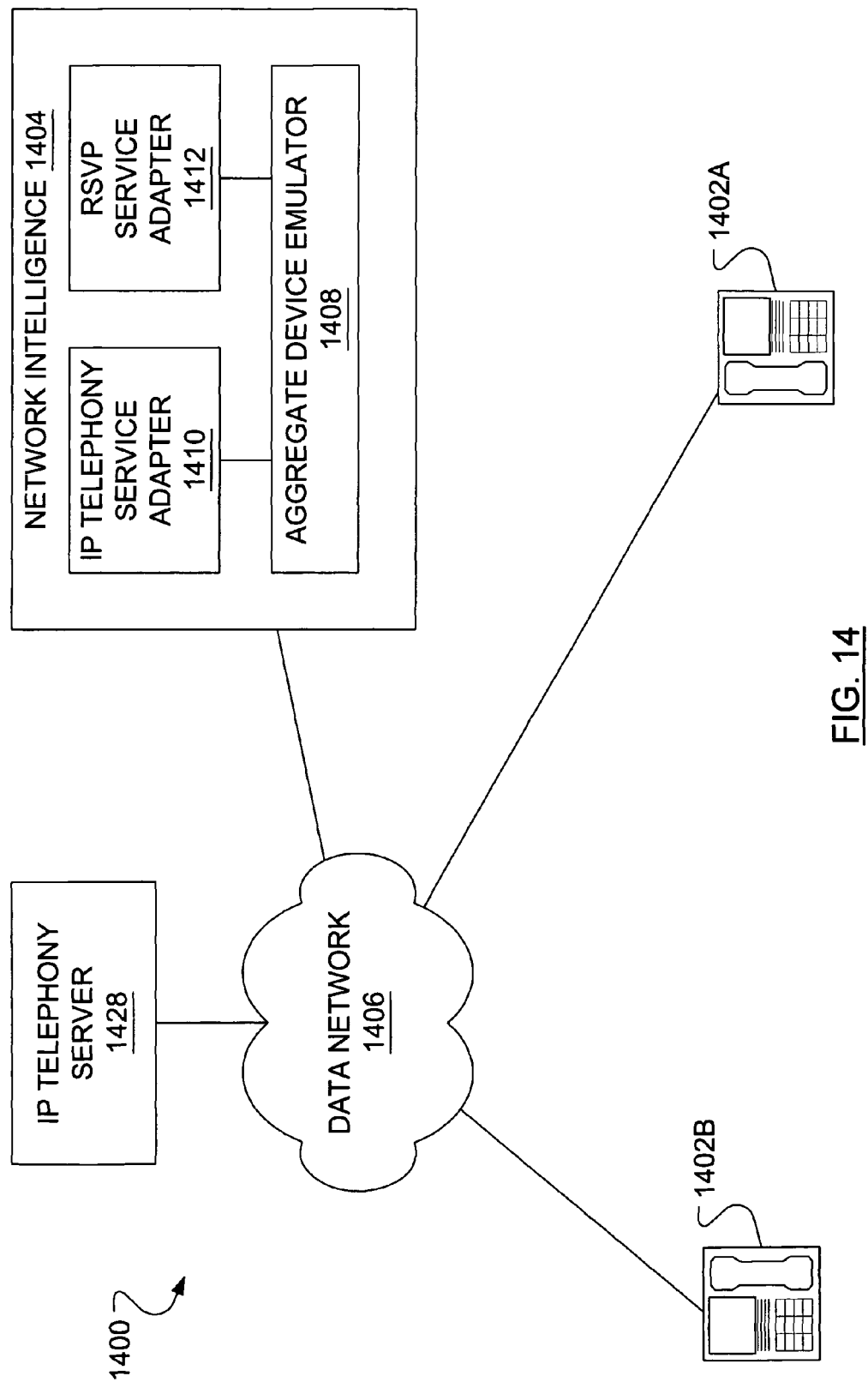
FIG. 14 schematically illustrates an exemplary system for packet based telephony over a data network including a network intelligence, a server and two aggregate devices.

FIG. 14 illustrates an exemplary network system 1400 of use in a demonstration of the present invention in operation for the provision of Internet telephony. A (local) stimulus telephone station apparatus 1402A connects to a data network 1406. Also connected to the data network 1406 are an exemplary network intelligence 1404, an IP telephony server 1428 and a remote telephone station apparatus 1402B. The network intelligence 1404 includes an aggregate device emulator 1408 for the stimulus telephone station apparatus 1402A, an IP telephony service adapter 1410 associated with the service provided by the IP telephony server 1428, and an RSVP service adapter 1412.

Figure 15:
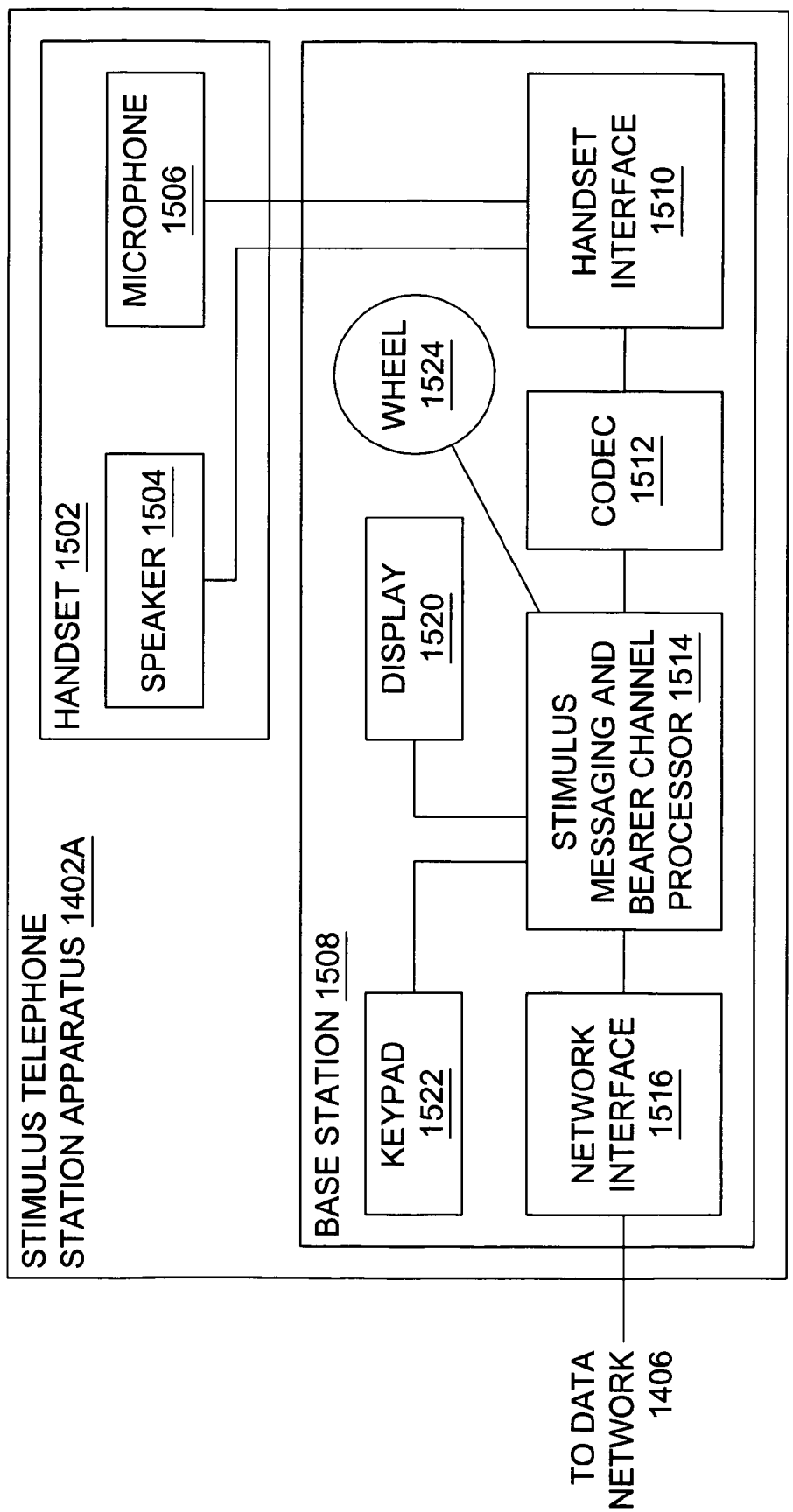
FIG. 15 schematically illustrates elements of an apparatus for use in the system of FIG. 14 in an embodiment of the present invention.

As shown in the exemplary telephone layout of FIG. 15, typical components of the stimulus telephone station apparatus 1402A include a base station 1508 and a handset 1502. More particularly, the handset 1502 includes a speaker 1504 and a microphone 1506. The connection between the base station 1508 and the handset 1502 may be wireline as shown or wireless as known. The base station 1508 provides: a network interface 1516 for connecting to the data network 1406 of FIG. 14; a stimulus messaging and bearer channel processor 1514 that, in this example, connects to a display 1520, a keypad 1522 and a control wheel 1524; a codec 1512; and a handset interface 1510 for connecting the base station 1508 to the handset 1502. The control wheel 1524 is a stimulus component allowing user control of the display 1520.

In FIG. 14, the exemplary network intelligence 1404 maintains a logical model for one or many stimulus telephone station apparatus such as the stimulus telephone station apparatus 1402A. Using this approach, the functional state of the stimulus telephone station apparatus 1402A is controlled by the network intelligence 1404, and stimulus messaging is used to pass information and control between the network intelligence 1404 and the stimulus telephone station apparatus 1402A. From the point of view of the network intelligence 1404, the stimulus telephone station apparatus 1402A is merely an aggregation of stimulus devices. The network intelligence 1404 preferably includes elemental control message drivers (not shown) for each of the stimulus components (namely, in this example, the keypad 1522, the display 1520, the wheel 1524 and the handset 1502) that make up a user interface for the stimulus telephone station apparatus 1402A.

Additionally, the exemplary network intelligence 1404 allows installable service adapters, for example, the IP telephony service adapter 1410, to provide additional services or capabilities to be projected onto the stimulus telephone station apparatus 1402A. The installable service adapters use information about the state of the user interface, as maintained by network intelligence 1404, and communicate at a functional level with a compatible functional server located somewhere in the data network 1406, for example the IP telephony server 1428. This communication at a functional level may, for example, make use of a protocol specified by ITU-T Recommendation H.323, "Packet-Based Multimedia Communication Systems," the contents of which are incorporated herein by reference, the Session Initiation Protocol (SIP) (discussed in IETF RFC 2543 and incorporated herein by reference), the Megaco Protocol (already discussed herein), or the Media Gateway Control Protocol (MGCP, Version 1.0 of which is described in IETF RFC 2705 and incorporated herein by reference). Using this approach, the stimulus telephone station apparatus 1402A appears to the IP telephony server 1428 as a functional device. Based on the above, it should be obvious to a person skilled in the art that the network intelligence 1404 could be designed to allow multiple service adapters to be installed and that these service adapters could be designed to communicate with each other, either directly or through the resource context manager of the aggregate device emulator 1408, to provide visibility rules that would allow the stimulus telephone station apparatus 1402A to be shared with all of the associated servers located in data network 1406. By providing these capabilities, the network intelligence 1404 allows the stimulus telephone station apparatus 1402A to appear as a different functional device by simply replacing one service adapter with another service adapter that provides a different functional messaging interface.

Although, as mentioned above, the service adapters may communicate with each other, it should be apparent to a person skilled in the art that, in some cases, service adapters may communicate only indirectly via the resource context manager and thus be unaware of each other. It should also be apparent that although telephony services are used extensively for examples herein, the present invention may provide access to data network services that do not relate to telephony.

Another example of the operation of the present invention may be considered in view of FIG. 14. In this example, an alternate method of communication is employed at the functional messaging level. Instead of having all functional messages sent from the network intelligence 1404 to the server on behalf of the aggregate device, the network intelligence 1404 routes all functional messages through a given component of the aggregate device. This technique, described below in detail, allows the given component to appear as a functional device to the data network server. If a user of the stimulus telephone station apparatus 1402A wishes to call a user of the remote telephone station apparatus 1402B, then a handset of the stimulus telephone station apparatus 1402A is lifted off-hook and an indication of a desired destination number for the remote telephone station apparatus 1402B is input. This indication would typically be accomplished by pressing digit keys of the keypad 1522 (FIG. 15) of the stimulus telephone station apparatus 1402A, but may be accomplished through a selection of an entry in an address book (not shown) available via the network intelligence 1404 and accessed through manipulation of user interface components (like the wheel 1524 and the display 1520, see FIG. 15) of the stimulus telephone station apparatus 1402A. Alternatively, the indication of a desired destination number may be accomplished through network intelligence-controlled functional signaling to retrieve a destination number from a handheld computer, where the destination number is associated with a name.

Notification of the event of the stimulus telephone station apparatus 1402A going off-hook and the indication of the desired destination number are transmitted using the stimulus protocol from the stimulus telephone station apparatus 1402A to the network intelligence 1404 as stimulus messages. These event notifications are received by the aggregate device emulator 1408 resident in the network intelligence 1404 and are captured as state changes in the corresponding logical device model as previously described. The state changes are then sent to the IP telephony service adapter 1410 and, based on call state or other information held in the service adapter service adaptation logic, the IP telephony service adapter 1410 interprets these state changes and generates functional messages appropriate for sending to the IP telephony server 1428. These functional messages are then encapsulated inside of stimulus messages, by the network intelligence 1404, and sent to the stimulus telephone station apparatus 1402A. The stimulus telephone station apparatus 1402A receives the stimulus messages and, after removing the encapsulation at the stimulus messaging and bearer channel processor 1514 (FIG. 15), recognizes the contents as functional messages having an associated network address for a destination.

The stimulus telephone station apparatus 1402A then sends the functional messages over the data network 1406 to the IP telephony server 1428 at the network address specified in the encapsulated functional message contained in the stimulus messaging received at the stimulus telephone station apparatus 1402A. Thus, as far as the IP telephony server 1428 is concerned, the functional messages have originated from an addressable component of the stimulus telephone station apparatus 1402A, not from the network intelligence 1404. Functional signaling that is returned to the stimulus telephone station apparatus 1402A from the IP telephony server 1428 is encapsulated inside of stimulus messages and sent to the network intelligence 1404. The functional signaling, for instance containing an IP address corresponding to the destination number for the remote telephone station apparatus 1402B, is interpreted by the IP telephony service adapter 1410.

The IP telephony service adapter 1410 then may have a requirement to provide instructions to the remote telephone station apparatus 1402B to reserve a virtual (or logical) channel through the data network 1406 over which the call may take place (a bearer channel). The network intelligence 1404 preferably includes a service adapter (client) 1412 capable of bandwidth reservation and/or other Quality of Service management functions (for example, the Resource Reservation Protocol or "RSVP"). Operations of the network system 1400 with use of RSVP are described here for explanatory purposes. The IP telephony service adapter 1410 may communicate to the RSVP service adapter 1412 a request for a virtual channel through the data network 1406 from the stimulus telephone station apparatus 1402A to the remote telephone station apparatus 1404B with Quality of Service guarantees befitting a voice channel. RSVP signaling appropriate to this request may then be sent by the network intelligence 1404 to the stimulus telephone station apparatus 1402A encapsulated within stimulus messages. The signaling is received by the stimulus telephone station apparatus 1402A, de-encapsulated and sent out on the data network 1406 as previously described. Thus, as far as nodes in the data network 1406 are concerned, the RSVP signaling originates at the stimulus telephone station apparatus 1402A, even though the stimulus telephone station apparatus 1402A is not equipped with an RSVP client.

Return RSVP signaling, confirming setup of a virtual channel to the remote telephone station apparatus 1402B, arrives at the stimulus telephone station apparatus 1402A. The stimulus telephone station apparatus 1402A then encapsulates the return RSVP signaling within stimulus messages and sends the encapsulated return RSVP signaling to the network intelligence 1404. The network intelligence 1404 de-encapsulates return RSVP signaling at the aggregate device emulator 1408 particular to the stimulus telephone station apparatus 1402A. The RSVP service adapter 1412 then interprets the return RSVP signaling and communicates the information to the IP telephony service adapter 1410. Appropriate call setup messages (i.e., call setup messages specified by ITU-T Recommendation H.323, "Packet-Based Multimedia Communication Systems," the contents of which are incorporated herein by reference) may then be sent, over the data network 1406, to the remote telephone station apparatus 1402B. In particular, the call setup messages are encapsulated in stimulus messages and sent by the IP telephony service adapter 1410 to the stimulus telephone station apparatus 1402A where the call setup messages are de-encapsulated and sent out on the data network 1406 as previously described, to the remote telephone station apparatus 1402B. Once the call setup messages have been processed, a two-way conversation using ITU-T H.323 between users at the stimulus telephone station apparatus 1402A and the remote telephone station apparatus 1402B may proceed.

It is notable that, throughout this process, it appears to the IP telephony server 1428 and the remote telephone station apparatus 1402B that the stimulus telephone station apparatus 1402A contains the necessary logic for functional message generation and handling. However, the stimulus telephone station apparatus 1402A need not be aware of the meaning of the functional messages, need not process their contents and therefore does not require local logic to implement the functional messaging protocols. The stimulus telephone station apparatus 1402A may simply act as a proxy for the logic contained in the network intelligence 1404. It is also notable that this same pattern of interaction can be made to apply to many other protocols, where the associated protocol logic is implemented in the network intelligence and proxied by the end device.

The earlier provided definition of the Megaco Protocol assigns the term "multimedia gateway" to a connection setup device and media-translator/media-handler (like a Public Switched Telephone Network trunk interface or an IP telephone). A collection of media-translator/media-handlers may then be controlled by a "multimedia gateway controller" using the Megaco Protocol. However, unlike the architecture suggested by the present invention, Megaco Protocol documentation does not currently describe the aggregation of several diverse media-translator/media-handlers to present a logical model of an aggregate device to an end-user application. Moreover, the Megaco Protocol does not currently contemplate a "cascade" control scheme, which will be described in the context of the present invention as follows.

Figure 16:
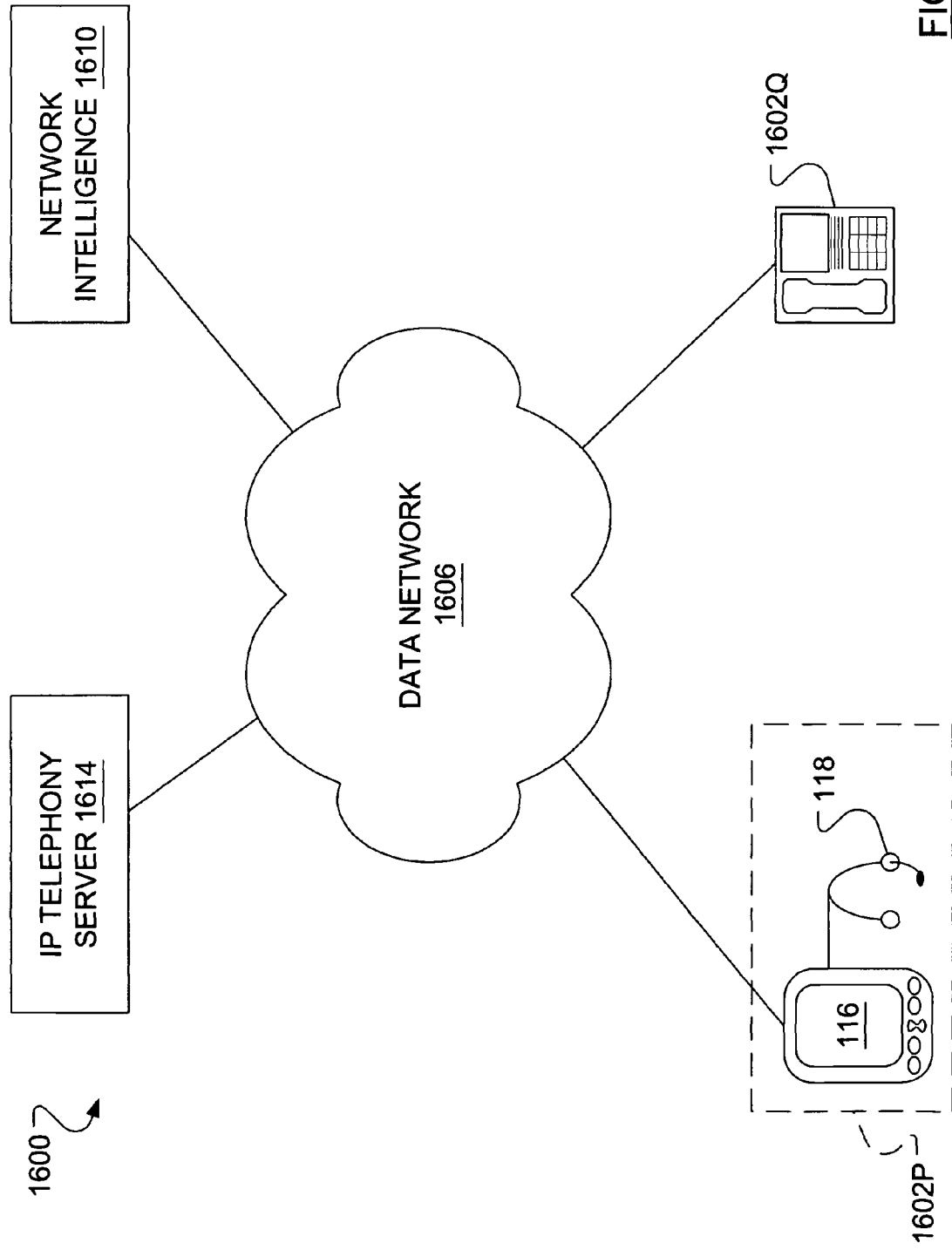
FIG. 16 schematically illustrates an exemplary system for provision of data network services over a data network including a network intelligence, a server and two aggregate devices.

An example of the above-mentioned cascade control scheme is presented in FIG. 16. In an exemplary cascade network system 1600, a first stimulus telephone station apparatus 1602P and a second stimulus telephone station apparatus 1602Q are under control of a telephony network intelligence 1610. Each of the stimulus telephone station apparatus 1602P, 1602Q appear to the telephony network intelligence 1610 as a single device with all the expected functionality of an IP telephone. As such, a single elemental control message driver is included in each of the aggregate device emulators that correspond to the stimulus telephone station apparatus 1602P, 1602Q. However, the stimulus telephone station apparatus 1602P is, in reality, not an IP telephone, but is the handheld computing device 116 and the associated mobile headset 118. Included in the handheld computing device 116 is a network intelligence with a service adapter that allows the combination of the handheld computing device 116 and the mobile headset 118 to appear to the telephony network intelligence 1610 as a device functionally equivalent to the second stimulus telephone station apparatus 1602Q.

Figure 17:
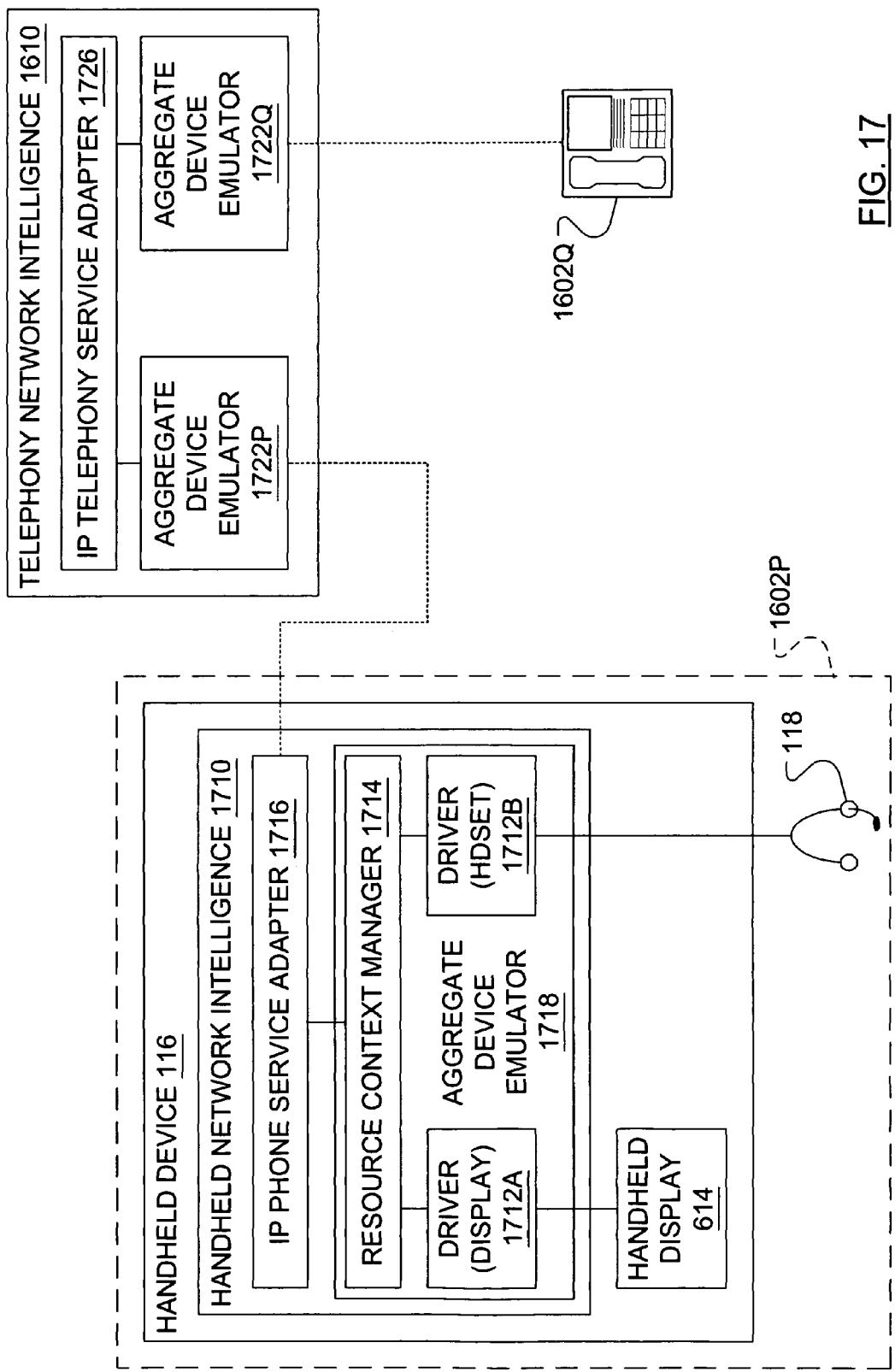
FIG. 17 schematically illustrates functional interaction of devices in the system of FIG. 16 in an embodiment of the present invention.

The cascading is perhaps more clearly described in conjunction with FIG. 17. The telephony network intelligence 1610 is shown to include an IP telephony service adapter 1726, a first aggregate device emulator 1722P for the first stimulus telephone station apparatus 1602P and a second aggregate device emulator 1722Q for the second stimulus telephone station apparatus 1602Q. As mentioned above, the handheld computing device 116 includes a network intelligence 1710 with an IP telephone service adapter 1716. The IP telephone service adapter 1716 allows a logical model maintained by a resource context manager 1714 within a handheld aggregate device emulator 1718 to appear to the telephony network intelligence 1610 as an IP telephone. The aggregate device emulator 1718 includes an elemental control message driver 1712A for the handheld display 614 and an elemental control message driver 1712B for the mobile headset 118.

Terms used in the description of the Megaco Protocol may be extended in light of the present invention and mapped to the devices of FIG. 17. The telephony network intelligence 1610 may be seen as a extended Media Gateway Controller (eMGC). Just as an MGC controls a Media Gateway (MG), an eMGC controls an extended Media Gateway (eMG). Each of the first stimulus telephone station apparatus 1602P and the second stimulus telephone station apparatus 1602Q may be considered an eMG. However, the first stimulus telephone station apparatus 1602P may also be considered an eMGC because of the control the first stimulus telephone station apparatus 1602P exercises over the handheld display 614 and the mobile headset 118, each of which may be considered an eMG. As will be appreciated, such a cascade scheme may extend over several layers and may be useful in maintaining control of devices at increasing degrees of granularity and/or aggregation.

A further advantage of this cascade scheme relates to failover, i.e., the change in control of an aggregate device when the primary network intelligence fails. Where a primary eMGC in control of a particular eMG fails, the control of the particular eMG may transfer to a secondary eMGC which, before the failure controlled the primary eMGC as an eMG.

The present invention has, thus far, been described starting at a point in mid operation. It may be of use to describe potential ways in which a network intelligence becomes aware of a stimulus component and the manner in which stimulus components are associated with one another. Returning to FIG. 2, a user may be able to conduct a registration session, say using a web-based graphical user interface, during which the user registers each of the workstation components (mouse, keyboard, display) by network address, or more specific identification. The result of a registration session may be one or more table entries which associate the workstation components with each other.

Alternatively, a component of an aggregate device may register itself with a network intelligence automatically. Methods by which media gateways may register themselves automatically with media gateway controllers are many, varied, and known to persons skilled in the art. Returning to FIG. 2, when a component becomes visible to the network intelligence 104, say, by being turned on by the user or by being connected to the data network 106 (with or without wires), the component may send to the network intelligence 104 a stimulus message essentially providing an identity and indicating a change in operational state. Such a stimulus message would be eventually received by the elemental control message router 208. Having no aggregate device emulator to which to send the stimulus message, the elemental control message router 208 sends the stimulus message to the aggregate device emulator manager 218. Responsive to receiving the stimulus message announcing the operational state of the component, the aggregate device emulator manager 218 initiates a new aggregate device emulator and the new aggregate device emulator initiates an elemental control message driver for the component. Concurrent with the initiation of the new aggregate device emulator, the elemental control message router 208 and the elemental control message formatter 212 are informed by the aggregate device emulator manager 218 of the newly-established correlation between the component and the newly-initiated aggregate device emulator. This informing allows future correspondence between the component and the newly-initiated aggregate device emulator to be appropriately routed.

Figure 18:
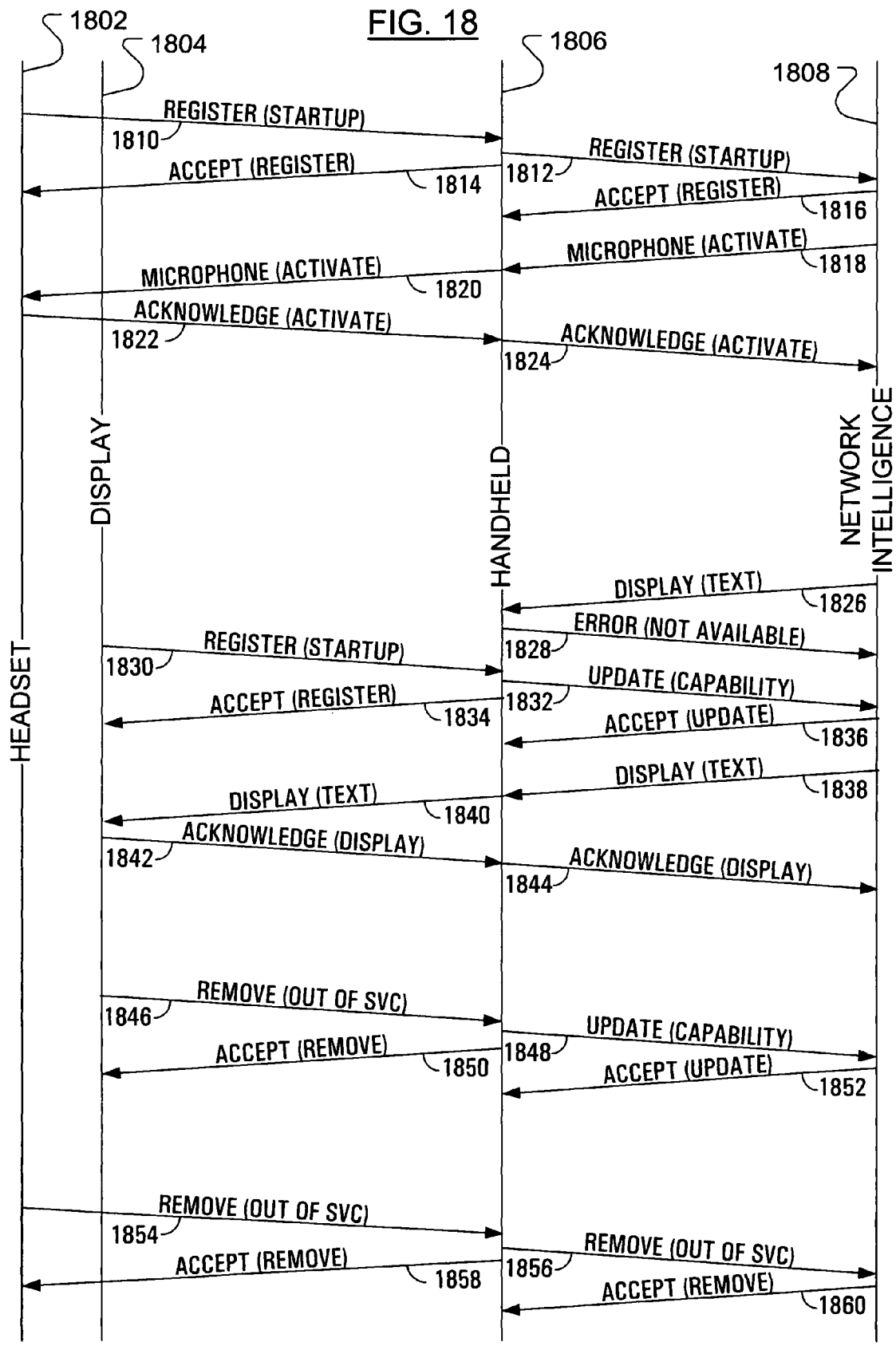
FIG. 18 is a process flow diagram.

A detailed exchange of Megaco-like messaging for registration and de-registration (setup and teardown) is illustrated in FIG. 18. Lines are employed to represent various elements of FIG. 17. In particular, a line 1804 is used to represent the handheld display 614, a line 1802 is used to represent the mobile headset 118, a line 1806 is used to represent the handheld computing device 116 and a line 1808 is used to represent the telephony network intelligence 1610. On being powered on, the mobile headset 118 sends a message 1810 to register with the handheld computing device 116, or more specifically, with the handheld network intelligence 1710. The handheld computing device 116, or, more specifically, the IP telephone service adapter 1716, sends a message 1812 to register the first stimulus telephone station apparatus 1602P with the telephony network intelligence 1610. The handheld computing device 116 then sends a message 1814 back to the mobile headset 118 to accept registration. The telephony network intelligence 1610 then sends a message 1816 back to the IP telephone service adapter 1716 to accept registration.

Having registered the first stimulus telephone station apparatus 1602P, the telephony network intelligence 1610 may send a message 1818 containing an instruction to activate a microphone component assumed to be associated with the first stimulus telephone station apparatus 1602P. A message 1820 is then sent from the handheld aggregate device emulator 1718 to the mobile headset 118 to activate the microphone. The mobile headset 118 then sends a return message 1822 to acknowledge the activation of the microphone and, subsequently, an acknowledgement message 1824 is sent from the IP telephone service adapter 1716 to the telephony network intelligence 1610.

The telephony network intelligence 1610 may then send a message 1826 containing an instruction to display some text on a display assumed to be associated with the first stimulus telephone station apparatus 1602P. A message 1828 is then sent from the IP telephone service adapter 1716 to the telephony network intelligence 1610 to indicate that an error has occurred because a display in unavailable at the first stimulus telephone station apparatus 1602P.

The handheld display 614 may then send a message 1830 to register with the handheld network intelligence 1710. Having received registration of the handheld display 614, the handheld network intelligence 1710 may send a capability update message 1832 to indicate to the telephony network intelligence 1610 the newly-registered display capabilities. The handheld aggregate device emulator 1718 then sends a subsequent message 1834 to the handheld display 614 to accept the registration. A message 1836 is then sent from the telephony network intelligence 1610 to the handheld network intelligence 1710 to accept the update indication of newly-registered display capabilities. The next attempt at sending a message 1838 containing an instruction to display some text on a display assumed to be associated with the first stimulus telephone station apparatus 1602P causes a message 1840 to be generated at the handheld network intelligence 1710 and sent to the handheld display 614. Once received, the handheld display 614 sends a message 1842 acknowledging receipt of the display instruction to the handheld network intelligence 1710. The IP telephone service adapter 1716 then sends an acknowledgement message 1844 to the telephony network intelligence 1610.

When powering down, the handheld display 614 sends a message 1846 to the handheld network intelligence 1710 to remove the display capabilities from the handheld aggregate device logical model maintained by the resource context manager 1714. The handheld network intelligence 1710 sends a capability update message 1848 to indicate to the telephony network intelligence 1610 the removal of display capabilities and a message 1850 to the handheld display 614 to accept the removal. A message 1852 is then sent from the telephony network intelligence 1610 to the handheld network intelligence 1710 to accept the update indicating removal of display capabilities.

When powering down, the mobile headset 118 sends a message 1854 to the handheld network intelligence 1710 to remove the audio capabilities from the handheld aggregate device logical model maintained by the resource context manager 1714. The IP telephone service adapter 1716, sends a message 1856 to take the first stimulus telephone station apparatus 1602P completely out of service at the telephony network intelligence 1610. The handheld network intelligence 1710 sends a message 1858 to the mobile headset 118 to accept the removal. The telephony network intelligence 1610 then sends a message 1860 back to the IP telephone service adapter 1716 to accept the removal.

In summary then, in a first case, a service adapter may present itself directly to a server of data network services as a client (i.e., a communications end point) with address physically associated with a network intelligence (e.g., a port at the IP address of the network intelligence). In this case all data flow between a component of an aggregate device (the real end point) and the server must be processed by the service adapter. Data objects (e.g., image, sound and video files) referenced by any client/server markup language commands, must be physically transported to and cached by the network intelligence. Data objects are referenced or spontaneously retransmitted in a context determined by a resource context manager at the network intelligence. Drawing or other commands may be translated from the format in which they are received into a format specific to the capabilities of particular components of the aggregate device, as determined by the resource context manager of the network intelligence.

In a second case, the service adapter may send functional commands, intended for the server, to a component of the aggregate device encapsulated in a protocol known to the component. These commands may be de-encapsulated by the component and transmitted in their native form to the server. The aggregate device is, through this process, made to appear as a fully capable client. Server commands received by the component are similarly encapsulated, and sent to the network intelligence, or, more specifically, the service adapter, for interpretation. In response, the network intelligence may send additional encapsulated functional commands to the component, for forwarding to the server, and/or control commands to the component. Data objects associated with the server commands may be relayed to the network intelligence for caching (or translation), or cached at the component for presentation in accordance with instructions generated by the network intelligence resource context manager and drivers.

Notably, in the most likely application of the present invention, the above two cases may be combined. That is, a network intelligence may execute multiple service adapters, where some service adapters may present themselves directly to a server of data network services as a client while other service adapters send functional commands, intended for particular servers, to individual device components encapsulated in a protocol known to the components.

Where client-server control protocols permit, the network intelligence may instruct the server to send data objects directly to a component of the aggregate device and all other commands to the network intelligence. The component may then present these data objects in accordance with instructions generated by the network intelligence resource context manager and drivers.

As will be appreciated, the complexity of the functions of a particular component within an aggregate device is limited only by the extent to which the behavior of the particular component is predictable by the network intelligence.

As will be apparent to a person skilled in the art, while the service adapters described herein by example are designed in the context of providing access to network-based services, it is equally possible to design service adapters in the context of providing stand-alone services. A given stand-alone service would be based entirely on service adaptation logic local to a given service adapter and, as such, would not require interaction with network-based servers or services.

Furthermore, in the case of providing access to a rudimentary data network service, a network intelligence may handle service adaptation without the use of a specific service adapter but, instead, through the use of the resource context manager.

In an alternative embodiment of the present invention, at least one device component may communicate with a network intelligence without the use of a network. This communication may occur over a direct wired connection or even a wireless connection. In this embodiment a connection to a data network is generally required by the network intelligence for communication with data network services or other device components to which to provide control. However, should the network connection become entirely or partially inoperable, the network intelligence may continue to provide stand-alone services to a subset of device components, where communication with the subset does not depend on the network.

Other modifications will be apparent to those skilled in the art and, therefore, the invention is defined in the claims.

We claim:

1. A method of providing device control to a plurality of device components, said device control enabling interaction of a data network service with said plurality of device components, said method comprising:

communicating, via a data network, with a plurality of stimulus device components using stimulus messaging in accordance with an elemental control protocol;

logically associating said plurality of device components in an aggregate logical device;

maintaining a logical model of said aggregate logical device wherein a state of each stimulus device component within said aggregate logical device is maintained;

providing access to said data network service by representing said plurality of stimulus device components to said data network service as said aggregate logical device; and wherein said representing further comprises, encapsulating a message destined for a server of said data network service to result in an encapsulated message, and sending said encapsulated message to at least one of said plurality of stimulus device components for forwarding to said server of said data network service.

2. The method of claim 1 wherein said elemental control protocol is Megaco Protocol.

3. The method of claim 1 wherein said elemental control protocol is Session Initiation Protocol (SIP).

4. The method of claim 1 wherein said elemental control protocol is H.323 protocol.

5. The method of claim 1 wherein said maintaining said logical model further comprises dynamically adding a given device component to said logical model.

6. The method of claim 1 wherein said maintaining further comprises dynamically removing a given device component from said logical model.

7. The method of claim 1 wherein a server of said data network service is physically associated with at least one device component.

8. The method of claim 1 wherein said data network service is a first data network service and wherein said providing comprises:

executing a first data network service adapter application corresponding to a server of said first data network service; and logically associating said first data network service adapter application with said aggregate logical device.

9. The method of claim 8 further comprising:

providing access to a second data network service by representing said plurality of device components to said second data network service as said aggregate logical device; and where said providing includes executing a second data network service adapter application corresponding to said server of said second data network service and logically associating said second data network service adapter application with said aggregate logical device.

10. The method of claim 9 further comprising routing, as necessary, said communicating with said plurality of device components to an appropriate one of either said first data network service adapter application of said second data network service adapter application.

11. The method of claim 9 wherein said providing comprises:

executing a compound data network service adapter application comprising a logical association of:

said first data network service adapter application corresponding to said server of said first data network service; and a second data network service adapter application corresponding to said server of said server of said second data network service; and logically associating said compound data network service adapter application with said aggregate logical advice.

12. The method of claim 11 wherein said server of said first data network service is functionally associated with said server of said second data network service.

13. The method of claim 9 further comprising enforcing visibility rules for mediating said communication with one of said plurality of device components as said communication relates to said first data network service adapter application and said second data network service adapter application.

14. The method of claim 8 wherein said representing further comprises:

receiving an encapsulated message, including a message from a server of said data network service, from at least one of said plurality of device components; and de-encapsulating said encapsulated message for forwarding to said first data network service adapter application.

15. The method of claim 1 wherein at least one of said plurality of stimulus device components is connected to a data network.

16. The method of claim 1 further comprising:

communicating with a second plurality of stimulus device components using stimulus messaging in accordance with the elemental control protocol;

logically associating the second plurality of stimulus device components in a second aggregate logical device; and maintaining a second logical model of said second aggregate logical device.

17. The method of claim 16 further comprising providing access to said data network service by representing said second plurality of stimulus device components to said data network service as said second aggregate logical device.

18. The method of claim 16 further comprising providing access to a second data network service by representing said second plurality of stimulus device components to said second data network service as said second aggregate logical device.

19. The method of claim 1 wherein a given stimulus device component of said plurality of stimulus device components is a primary network intelligence for providing device control to further ones of said plurality of device components.

20. The method of claim 19 wherein said elemental control protocol is Megaco Protocol.

21. The method of claim 19 wherein, upon loss of communication with said primary network intelligence, said method further comprises:

communicating with said further ones of said plurality of stimulus device components;

logically associating said further ones of said plurality of stimulus device components with one another as second aggregate logical device;

maintaining a second logical model of said second aggregate logical device; and providing access to said data network service by representing said further ones of said plurality of stimulus device components to said data network service as said second aggregate logical device.

22. The method of claim 1 wherein said providing comprises:

converting an indication of a change in a state of said logical model of said aggregate logical device into a request of said data network service; and sending said request to said data network service.

23. The method of claim 22 wherein said providing comprises:

receiving a response to said request of said data network service;

generating an interpretation of said response; and providing instructions, based on said interpretation, to change said state of said logical model of said aggregate logical device.

24. The method of claim 23 wherein said response comprises a media flow and, responsive to said interpretation of said response, said communicating further comprises sending said media flow to a given device component of said plurality of stimulus device components.

25. The method of claim 24 wherein said generating said interpretation further comprises, before said sending, converting said media flow from a format in which said media flow was received to a format understood by said given stimulus device component of said plurality of stimulus device components.

26. The method of claim 23 wherein said response comprises a data file and, responsive to said interpretation of said response, and communicating further comprises sending said data file to a given stimulus device component of said plurality of stimulus device components.

27. The method of claim 26 wherein said generating said interpretation further comprises, before said sending, converting said data from a format in which said data file was received to a format understood by said given stimulus device component of said plurality of stimulus device components.

28. The method of claim 22 wherein sending said request to said data network service further comprises instructing said data network service to direct a response to a given stimulus device component of said plurality of stimulus device components.

29. The method of claim 1 wherein said aggregate logical device comprises a logical device element corresponding to each of said plurality of stimulus device components and wherein a given logical device element corresponds to a particular stimulus device component and a device type of said given logical device element is different from a device type of said particular stimulus device component.

30. The method of claim 29 wherein said device type of said logical device element is "pointing device" and said device type of said particular stimulus device component is "microphone".

31. The method of claim 30 further comprising using speech recognition to convert a message received from said "microphone" device type to a state change of said "pointing device" device type.

32. A network intelligence for providing device control to a plurality of device components, said network intelligence comprising:
a processor;
a message driver for communicating with a plurality of stimulus device components using stimulus messaging in accordance with an elemental control protocol;
a resource context manager for:
logically associating said plurality of stimulus device components in an aggregate logical device;
maintaining a logical model of said aggregate logical device wherein a state of each stimulus device component within said aggregate logical device is maintained; and
a service adapter for representing said plurality of stimulus device components to said data network service as said aggregate logical device to provide access to said data network service, and
wherein said representing further comprises,
receiving an encapsulated message, including a message from a server of said data network service, from at least one of said plurality of stimulus device components, and de-encapsulating said encapsulated message for forwarding to said first data network service adapter application.

33. A computer readable medium containing computer-executable instructions which, when performed by a processor in a network intelligence for providing device control to a plurality of device components, cause the processor to:
communicate with a plurality of stimulus device components using stimulus messaging in accordance with an elemental control protocol;
logically associate said plurality of stimulus device components in an aggregate logical device;
maintain a logical model of said aggregate logical device wherein a state of each stimulus device component within said aggregate logical device is maintained;
represent said plurality of stimulus device components to said data network service as said aggregate logical device to provide access to said data network service, and
wherein said represent further comprises,
receive an encapsulated message, including a message from a server of said data network service, from at least one of said plurality of stimulus device components, and de-encapsulate said encapsulated message for forwarding to said first data network service adapter application.

34. A method of providing device control to at least one device component, said device control enabling interaction of a stand-alone service with said at least one device component, said method comprising:
communicating, via a data network, with said at least one stimulus device component using stimulus messaging in accordance with an elemental control protocol;
logically associating a plurality of device components in an aggregate logical device, said plurality of stimulus device components comprising said at least one stimulus device component;
maintaining a logical model of said aggregate logical device wherein a state of each stimulus device component within said aggregate logical device is maintained;
providing access to said stand-alone service by representing said plurality of stimulus device components to said stand-alone service as said aggregate logical device; and
wherein said representing further comprises,
encapsulating a message destined for a server of said data network service to result in an encapsulated message, and
sending said encapsulated message to at least one of said plurality of stimulus device components for forwarding to said server of said data network service.

35. A method of providing device control to at least one device component, said device control enabling interaction of a data network service with said at least one device component, and method comprising:
communicating with said at least one stimulus device component, wherein said communicating uses stimulus messaging in accordance with Session Initiation Protocol (SIP);
logically associating a plurality of stimulus device components in an aggregate logical device, said plurality of stimulus device components including said at least one stimulus device component;
maintaining a logical model of said aggregate logical device wherein a state of each stimulus device component within said aggregate logical device is maintained;
providing access to said data network service by representing said plurality of stimulus device components to said data network service as said aggregate logical device; and
wherein said representing further comprises, encapsulating a message destined for a server of said data network service to result in an encapsulated message, and sending said encapsulated message to at least one of said plurality of stimulus device components for forwarding to said server of said data network service.

36. A method of providing device control to at least one device component, said device control enabling interaction of a data network service with said at least one device component, and method comprising:

communicating with said at least one stimulus device component using stimulus messaging in accordance with an elemental control protocol;

logically associating a plurality of stimulus device components in an aggregate logical device, said plurality of stimulus device components including said at least one stimulus device component;

maintaining a logical model of said aggregate logical device wherein a state of each stimulus device component within said aggregate logical device is maintained; and providing access to said data network service by representing said plurality of stimulus device components to said data network service as said aggregate logical device, and said representing further comprises, encapsulating a message destined for a server of said data network service to result in an encapsulated message, and sending said encapsulated message to at least one of said plurality of stimulus device components for forwarding to said server of said data network service.

37. A method of providing device control to at least one device component, said device control enabling interaction of a data network service with said at least one device component, and method comprising:

communicating with said at least one stimulus device component using stimulus messaging in accordance with an elemental control protocol;

logically associating a plurality of stimulus device components in an aggregate logical device, said plurality of stimulus device components including said at least one stimulus device component;

maintaining a logical model of said aggregate logical device wherein a state of each stimulus device component within said aggregate logical device is maintained; and providing access to said data network service by representing said plurality of stimulus device components to said data network service as said aggregate logical device;

wherein said data network service is a first data network service;

wherein said providing further comprises, executing a first data network service adapter application corresponding to a server of said first data network service, and logically associating said first data network service adapter application with said aggregate logical device; and wherein said representing further comprises, receiving an encapsulated message, containing a message from a server of said data network service, from at least one of said plurality of stimulus device components, and de-encapsulating said encapsulated message for forwarding to said first data network service adapter application.

* * * * *